(12) United States Patent
Kwon et al.

(10) Patent No.: US 12,141,389 B2
(45) Date of Patent: Nov. 12, 2024

(54) ELECTRONIC DEVICE RECOGNIZING TOUCH AND PERFORMING DISPLAY

(71) Applicant: SAMSUNG ELECTRONICS CO., LTD., Suwon-si (KR)

(72) Inventors: Kunhyung Kwon, Hwaseong-si (KR); Kyounghwan Kwon, Seoul (KR); Youngseob Choi, Suwon-si (KR); Jonghan Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/744,822

(22) Filed: May 16, 2022

(65) Prior Publication Data

US 2022/0374127 A1    Nov. 24, 2022

(30) Foreign Application Priority Data

May 18, 2021 (KR) .......................... 10-2021-0064210

(51) Int. Cl.

| G06F 3/041 | (2006.01) |
|---|---|
| G06F 3/14 | (2006.01) |
| G06F 3/147 | (2006.01) |
| G06F 3/044 | (2006.01) |

(52) U.S. Cl.
CPC .......... *G06F 3/0416* (2013.01); *G06F 3/0412* (2013.01); *G06F 3/1407* (2013.01); *G06F 3/147* (2013.01); *G06F 3/04166* (2019.05); *G06F 3/044* (2013.01)

(58) Field of Classification Search
CPC .. G06F 3/0412; G06F 3/0416; G06F 3/04166; G06F 3/044; G06F 3/0445; G06F 3/0679; G06F 3/1407; G06F 3/147; G06F 13/385; G06F 13/4282
See application file for complete search history.

(56) References Cited

U.S. PATENT DOCUMENTS

| 8,780,065 | B2 | 7/2014 | Ribeiro et al. |
|---|---|---|---|
| 9,240,165 | B2 | 1/2016 | Bae et al. |
| 9,396,141 | B2 | 7/2016 | Maeda et al. |
| 9,880,677 | B2 | 1/2018 | Lee et al. |
| 10,430,918 | B2 | 10/2019 | Kim et al. |
| 10,643,545 | B2 | 5/2020 | Bae et al. |
| 10,762,870 | B2 | 9/2020 | Han et al. |
| 2008/0062139 | A1 | 3/2008 | Hotelling et al. |
| 2015/0160761 | A1 | 6/2015 | Lee et al. |
| 2020/0159904 | A1 | 5/2020 | Bae et al. |
| 2020/0363907 | A1 | 11/2020 | Heo et al. |

FOREIGN PATENT DOCUMENTS

KR  10-2020-0131644 A  11/2020

*Primary Examiner* — Julie Anne Watko
(74) *Attorney, Agent, or Firm* — Fish & Richardson P.C.

(57) ABSTRACT

An electronic device according to an example embodiment includes: a touch panel configured to sense a touch input; a display panel configured to output an image; a touch and display driver integration (TDDI) configured to control the touch panel and the display panel; and an interface circuit for data interfacing with a host, wherein the TDDI is configured to receive touch firmware data from the host via the interface circuit, and manage the touch firmware data by using at least one of a first volatile memory included in the interface circuit and the TDDI.

16 Claims, 22 Drawing Sheets

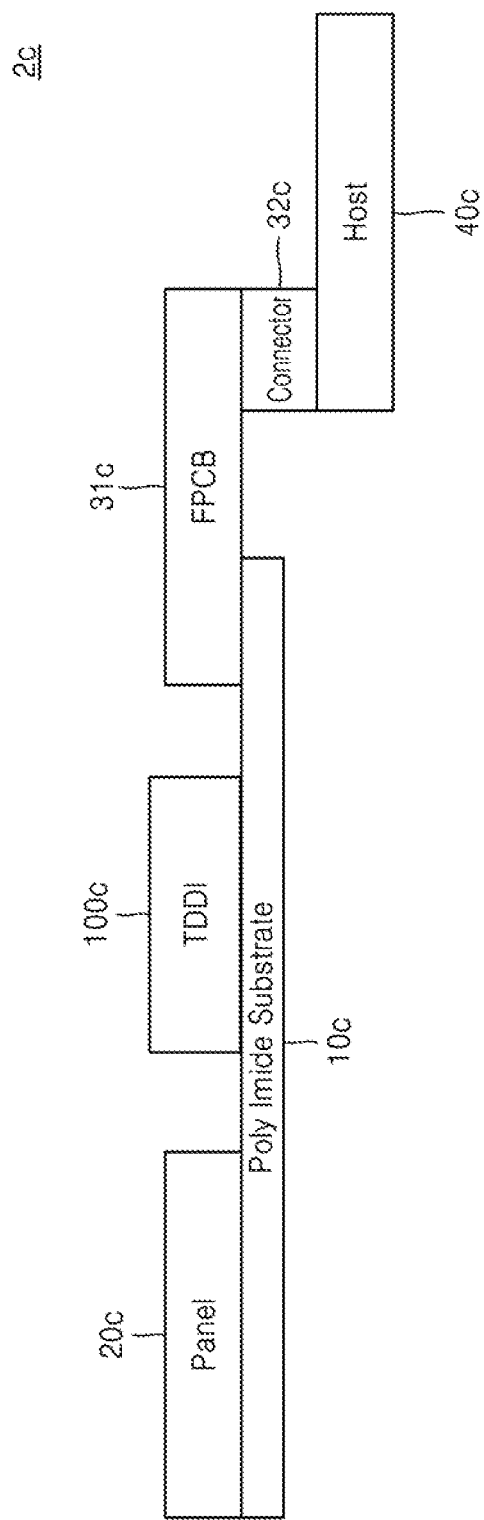

ELECTRONIC DEVICE RECOGNIZING TOUCH AND PERFORMING DISPLAY

CROSS-REFERENCE TO RELATED APPLICATION

This application is based on and claims priority under 35 U.S.C. § 119 to Korean Patent Application No. 10-2021-0064210, filed on May 18, 2021, in the Korean Intellectual Property Office, the disclosure of which is incorporated by reference herein in its entirety.

BACKGROUND

1. Field

Embodiments relate to an electronic device, and more particularly, to an electronic device recognizing a touch and performing a display, and an electronic system including the electronic device.

2. Description of the Related Art

Touch and display driver integration (TDDI) means an implementing technology of integrating a touch integrated circuit and a display driver integrated circuit into one circuit or one chip.

SUMMARY

An electronic device according to an example embodiment includes: a touch panel configured to sense a touch input; a display panel configured to output an image; a touch and display driver integration (TDDI) configured to control the touch panel and the display panel; and an interface circuit for data interfacing with a host. The TDDI may be configured to receive touch firmware data from the host via the interface circuit, and manage the touch firmware data by using at least one of the interface circuit and a first volatile memory that is included in the TDDI.

An electronic device according to an example embodiment includes: a touch/display module configured to sense a touch input, and output an image; a touch and display driver integration (TDDI) configured to control the touch/display module; and an interface circuit including a first interface for receiving touch firmware data and image data from a host. The TDDI may be configured to receive the touch firmware data from the host via the first interface, and execute touch firmware by storing the touch firmware data in a first volatile memory included in the TDDI.

An electronic device according to an example embodiment includes: a touch/display module configured to sense a touch input, and output an image; a touch and display driver integration (TDDI) configured to control the touch/display module; an interface circuit including a first interface for receiving touch firmware data and image data from a host; and a non-volatile memory for storing the touch firmware data. The TDDI may be configured to receive the touch firmware data from the host via the first interface, and store the touch firmware data in the non-volatile memory by using a first volatile memory included in the TDDI.

An electronic device according to an example embodiment includes: a touch panel configured to sense a touch input; a display panel configured to output an image; a display driver integrated circuit configured to control the display panel; and an interface circuit for data interfacing with a host. The display driver integrated circuit may be configured to receive touch firmware data for driving the touch panel from the host via the interface circuit, and manage the touch firmware data by using at least one of the interface circuit and a first volatile memory that is included in the display driver integrated circuit.

BRIEF DESCRIPTION OF THE DRAWINGS

Features will become apparent to those of skill in the art by describing in detail example embodiments with reference to the attached drawings in which:

FIGS. 2A through 2C are diagrams of implementation examples of electronic devices, according to example embodiments;

DETAILED DESCRIPTION

Figure 1:
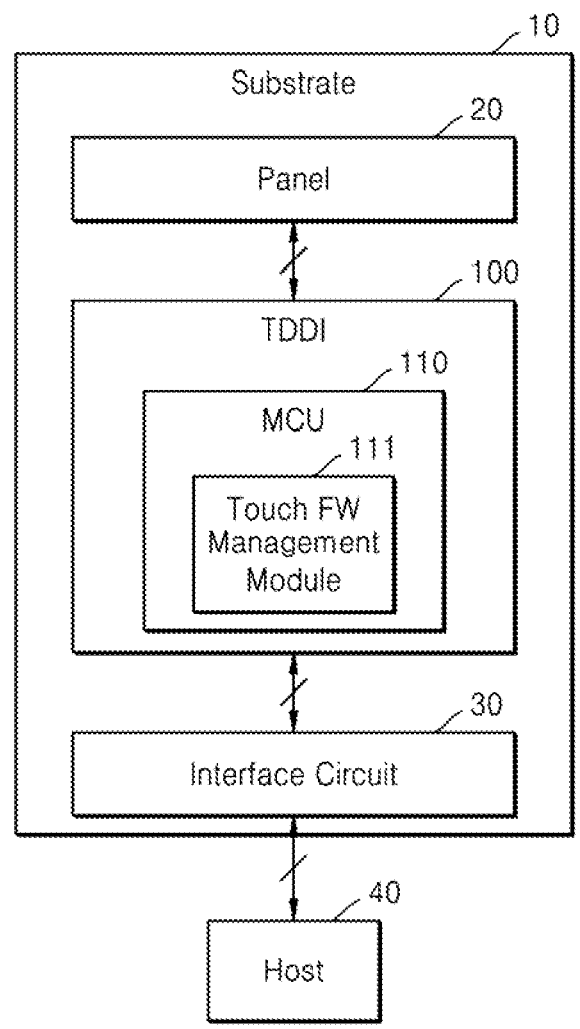
FIG. 1 is a block diagram of an electronic device according to an example embodiment.

FIG. 1 is a block diagram of an electronic device 1 according to an example embodiment.

An example of an electronic device such as that described in connection with FIG. 1 may include a device having an image display function. Examples of an electronic device may include at least one of a smartphone, a tablet personal computer (PC), a mobile phone, a video telephone, an e-book reader, a desktop PC, a laptop PC, a netbook computer, a personal digital assistant (PDA), a portable multimedia player (PMP), an MP3 player, mobile medical equipment, a camera, and a wearable device such as a head-mounted-device (HMD), electronic glasses, electronic clothes, an electronic bracelet, an electronic necklace, an electronic accessory, an electronic tattoo, or a smart watch.

In an example embodiment, an electronic device may include a smart home appliance having an image display function. The smart home appliance may include at least one of, e.g., a television, a digital video disk (DVD) player, an audio player, a refrigerator, an air conditioner, a vacuum cleaner, an oven, a microwave, a washing machine, an air cleaner, a set-top box, a TV box (for example, Samsung HomeSync™, Apple TV™, or Google TV™), a game console, an electronic dictionary, an electronic key, a camcorder, and an electronic photo frame.

In an example embodiment, an electronic device may include at least one of various medical equipment (for example, magnetic resonance angiography (MRA), magnetic resonance imaging (MRI), computed tomography (CT), a shooting camera, an ultrasound equipment, or the like), a navigation device, a global positioning system (GPS) receiver, an event data recorder (EDR), a flight data recorder (FDR), an automobile infotainment device, ship electronic equipment (for example, a ship navigation device, a gyro compass, or the like), aviation avionics, security equipment, automobile head units, industry or home robots, an automatic teller machine (ATM) or point of sales (POS) of a financial organization.

In an example embodiment, an electronic device may include at least one of a portion of furniture or building/structure including the image display function, an electronic board, an electronic signature receiving device, a projector, and various measurement equipment (for example, water, electricity, gas, and radio measurement equipment, or the like). An electronic device according to example embodiments may include one or more combinations of above-described various devices. In addition, an electronic device may include a flexible display device.

Referring to FIG. 1, the electronic device 1 may include a panel 20, a touch and display driver integration (hereinafter, TDDI) 100, an interface circuit 30, and a host 40.

In an example embodiment, the host 40 may test the panel 20, the TDDI 100, and an interface circuit 30, and may include a device controlling basic settings, and in this case, the host 40 may, as a test device, have a discrete configuration from the electronic device 1.

In an example embodiment, the panel 20, the TDDI 100, and the interface circuit 30 may be arranged on a substrate 10. Details regarding an arrangement on the substrate 10 will be described below with reference to FIGS. 2A through 2C.

In an example embodiment, the panel 20 may include a display panel and a touch panel. The panel 20 may be referred to as a touch display panel.

A display panel may include a display unit outputting a real image, and may include one of display devices displaying two-dimensional or three-dimensional images by receiving electrical signals from a thin film transistor-liquid crystal display (LCD) (TFT-LCD) panel, an organic light emitting diode (OLED) panel, a field emission display panel, a plasma display panel, etc.

A touch panel may include a touch sensor for sensing touch pressure of a user.

Details of the panel 20 will be described below with reference to FIGS. 3A and 3B.

In an example embodiment, the TDDI 100 may include a microcontroller unit (MCU) 110. The TDDI 100 may be an implementation of a display driver integrated circuit for driving and controlling a display driver integrated circuit panel and a touch controller for controlling a touch panel, into one semiconductor chip. However, the described example is not limited only to the TDDI 100, and it will be understood that the display driver integrated circuit may be implemented as a configuration discrete from the touch controller.

In an example embodiment, the TDDI 100 may communicate with the host 40. For example, the host 40 may include a main processor controlling an overall operation of the electronic device 1, and may be implemented as an application processor, a central processing unit (CPU), etc. The MCU 110 of the TDDI 100 may perform operations such as displaying and touch sensing by using the panel 20 in response to a control signal from the host 40.

In an example embodiment, the interface circuit 30 may provide transmission paths of various pieces of data transceived in the communication between the TDDI 100 and the host 40. As an example, the interface circuit 30 may be implemented as a flexible printed circuit board (PCB) (FPCB), and the interface circuit 30 may include various interfaces constituted by different number of pins. For example, the interface circuit 30 may include a mobile industry processor interface (MIPI), a serial peripheral interface (SPI), etc. In an example embodiment, the interface circuit 30 may be implemented to include the TDDI 100.

In an example embodiment, the MCU 110 may include a touch firmware (FW) management module 111. The touch FW management module 111 may manage the touch FW data transmitted from the host 40 by using at least one of first volatile memories (not illustrated) included in the TDDI 100 and the interface circuit 30. The touch FW data may be referred to as data for executing touch FW.

In an example embodiment, the touch FW management module 111 may receive the touch FW data via a first interface (not illustrated) which transmits image data in the interface circuit 30, and may store the received touch FW data in the first volatile memory (not illustrated) of the TDDI 100. Hereinafter, storing data in a memory may be interpreted as writing or programming data in the memory. The MCU 110 may access the first volatile memory (not illustrated), load the touch FW data, and execute the touch FW. As an example, the first volatile memory (not illustrated) may include static random access memory (RAM) (SRAM) operating as a cache of the MCU 110. However, this is merely an example embodiment, and the first volatile memory (not illustrated) may be implemented as various memories which support a data access speed greater than a certain speed level.

In an example embodiment, the touch FW management module 111 may receive the touch FW data via the first interface (not illustrated) which transmits image data in the interface circuit 30, and may store the received touch FW data in a second volatile memory (not illustrated) of the TDDI 100, e.g., as a buffer. Thereafter, the touch FW management module 111 may store the touch FW data stored in the second interface circuit (not illustrated) to a non-volatile memory (not illustrated) via the interface circuit 30. Thereafter, the MCU 110 may access the non-volatile memory (not illustrated), store the touch FW data in the first volatile memory (not illustrated) of the TDDI 100, and may execute the touch FW by accessing the first volatile memory (not illustrated) and loading the touch FW data. As an example, the second volatile memory (not illustrated) may include graphics random access memory (RAM) (GRAM) in which image data is stored. As an example, GRAM may be implemented as any one of dynamic RAM (DRAM), magnetoresistive RAM (MRAM), phase change RAM (PRAM), resistive RAM (RRAM), etc. In an example embodiment, a non-volatile memory (not illustrated) may be arranged outside the TDDI 100, and in an example embodiment, a non-volatile memory (not illustrated) may be stacked on the substrate 10 or the interface circuit 30.

On the other hand, the touch FW management module 111 may be implemented as a software module or hardware module, and furthermore, may be implemented as a software/hardware combination module. When the touch FW management module 111 is implemented as a software module, the touch FW management module 111 may be executed by the MCU 110.

In an example embodiment, the interface circuit 30 may further include the second interface (not illustrated) for transmitting the touch sensing data generated by the panel 20 to the host 40. The second interface (not illustrated) may support a relatively slower data transmission speed than the first interface (not illustrated) described above, and may include a smaller number of pins.

Example embodiments including the one of FIG. 1 have been described in the context of transmitting and managing data related with the touch FW by using the interface circuit 30. However, it will be understood that example embodiments may be applied to transmission and management of data related with the touch FW as well as FW for other operations.

The electronic device 1 according to an example embodiment may quickly complete a setting for the touch sensing operation by receiving the touch FW data from the host 40 at a rapid rate. In addition, the electronic device 1 may reduce production cost and efficiently secure a design area by reducing an unnecessary configuration of the interface circuit 30.

Figure 2A:
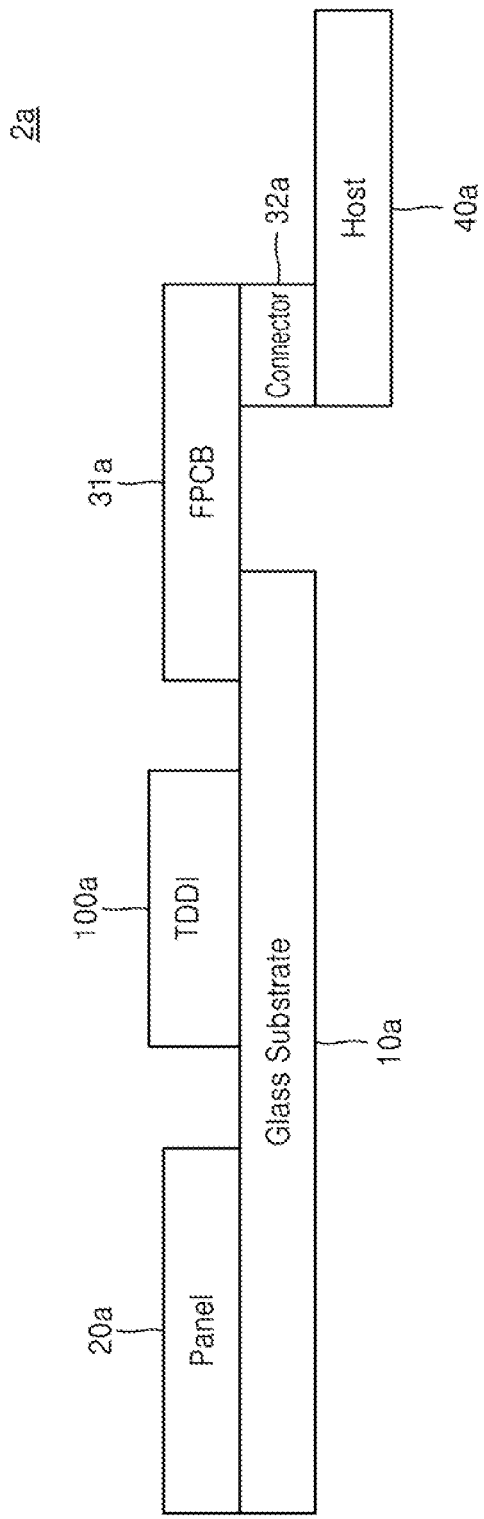
Figure 2B:
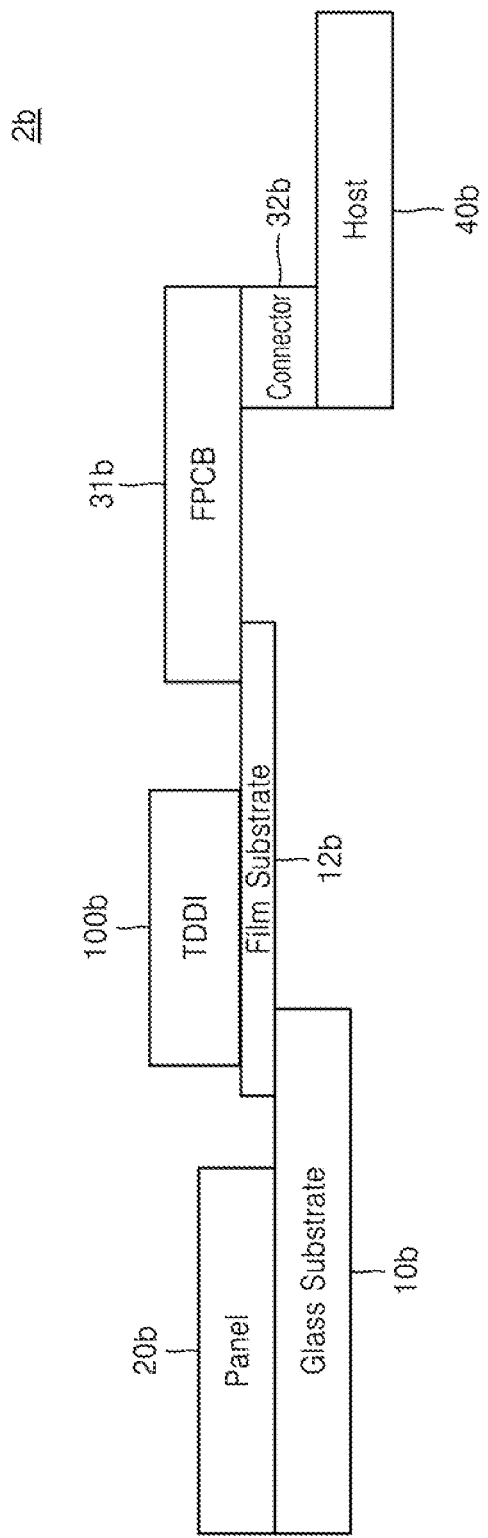

FIGS. 2A through 2C are diagrams of implementation examples of electronic devices 2a through 2c, respectively, according to example embodiments.

Referring to FIG. 2A, the electronic device 2a may include a glass substrate 10a, a panel 20a, a TDDI 100a, an FPCB 31a, a connector 32a, and a host 40a.

In FIG. 2A, the host 40a is illustrated as one block for convenience of description, but the host 40a may be implemented as a system on chip (SoC) arranged on a discrete substrate.

Portions of the panel 20a, the TDDI 100a, and the FPCB 31a may be arranged on the glass substrate 10a.

The FPCB 31a and the connector 32a may be one implementation example of the interface circuit 30 in FIG. 1, and various interfaces may be formed on the FPCB 31a. In an example embodiment, the first and second interfaces (not illustrated) described with reference to FIG. 1 may be formed on the FPCB 31a, and in some example embodiments, a non-volatile memory (not illustrated) described with reference to FIG. 1 may be arranged on the FPCB 31a. The connector 32a may be used for connection of interfaces on the host 40a and the FPCB 31a.

In addition, although not illustrated in FIG. 2A, an interface for connecting the TDDI 100a to the FPCB 31a may be formed on the glass substrate 10a or the FPCB 31a.

Referring to FIG. 2B, the electronic device 2b may include a glass substrate 10b, a panel 20b, a film substrate 12b, a TDDI 100b, an FPCB 31b, a connector 32b, and a host 40b.

Portions of the panel 20b and the film substrate 12b may be arranged on the glass substrate 10b. Portions of the TDDI 100b and the FPCB 31b may be arranged on the film substrate 12b.

The FPCB 31b may be connected to the host 40b via the connector 32b.

Duplicate descriptions on structures of the electronic device 2b of FIG. 2B and the electronic device 2a of FIG. 2A may be omitted.

Referring to FIG. 2C, the electronic device 2c may include a polyimide substrate 10c, a panel 20c, a TDDI 100c, an FPCB 31c, a connector 32c, and a host 40c.

Portions of the panel 20c, the TDDI 100c, and the FPCB 31c may be arranged on the polyimide substrate 10c.

The FPCB 31c may be connected to the host 40c via the connector 32c.

Duplicate descriptions on structures of the electronic device 2c of FIG. 2C and the electronic device 2a of FIG. 2A may be omitted.

Figure 3A:
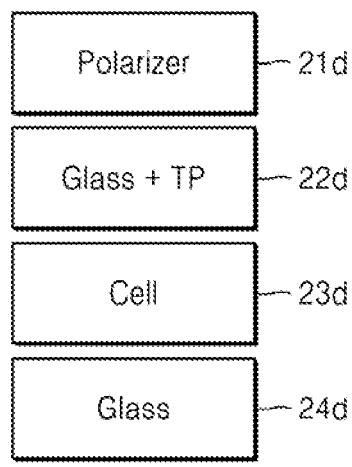
FIGS. 3A and 3B are diagrams of panels according to example embodiments.
Figure 3B:
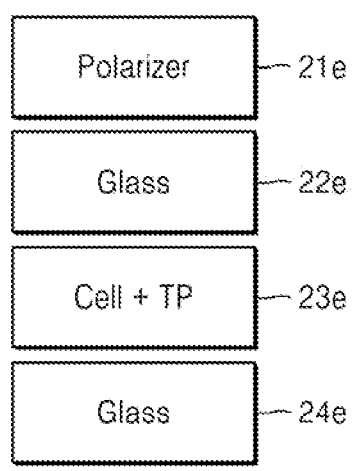

FIGS. 3A and 3B are diagrams of panels 20d and 20e, respectively, according to example embodiments.

In the drawing, each of the panels 20d and 20e is simply displayed as cells. Each of the panels 20d and 20e may include a plurality of pixels.

Referring to FIG. 3A, the panel 20d may include a polarizer 21d, a first glass panel 22d, a display panel 23d, and a second glass panel 24d.

The first glass panel 22d may include a touch panel TP. The touch panel TP may be a built-in type of the panel 20d, and may be defined as an on cell type. The first glass panel 22d may include various touch sensing electrodes.

The display panel 23d may include various display electrodes.

In an example embodiment, the panel 20d may further include more polarizers and glass panels.

Referring to FIG. 3B, the panel 20e may include a polarizer 21e, a first glass panel 22e, a display panel 23e, and a second glass panel 24e.

The display panel 23e may include the touch panel TP. In another implementation, a layer including the display panel 23e may include the touch panel TP. The display panel 23e may be referred to as a touch display panel. At least some of various electrodes equipped on the display panel 23e may be used as touch sensors. The touch panel TP may be a built-in type of the panel 20e, and may be defined as an in cell type.

Figure 4A:
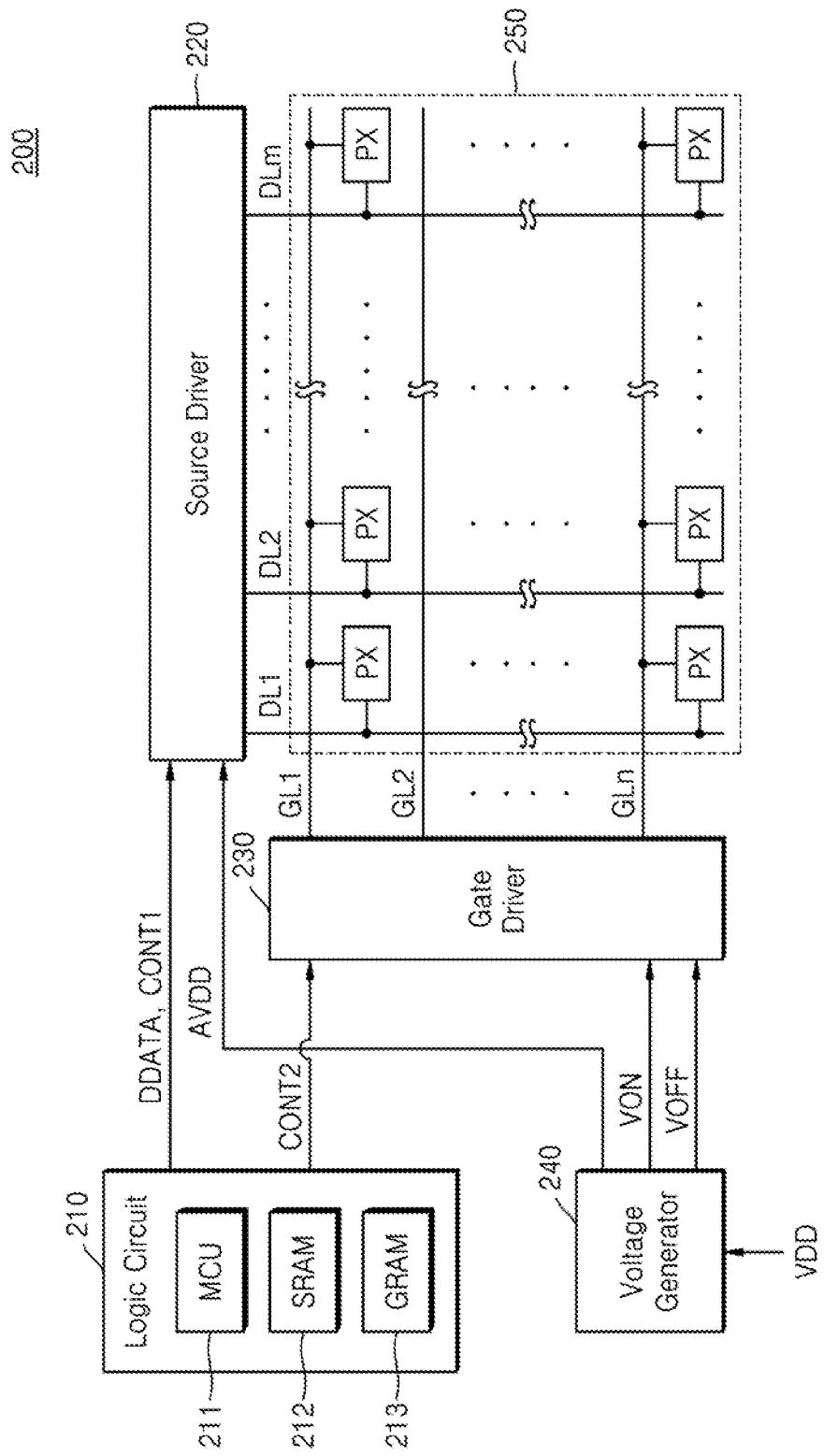
FIGS. 4A and 4B are diagrams of operations of an electronic device, according to example embodiments.
Figure 4B:
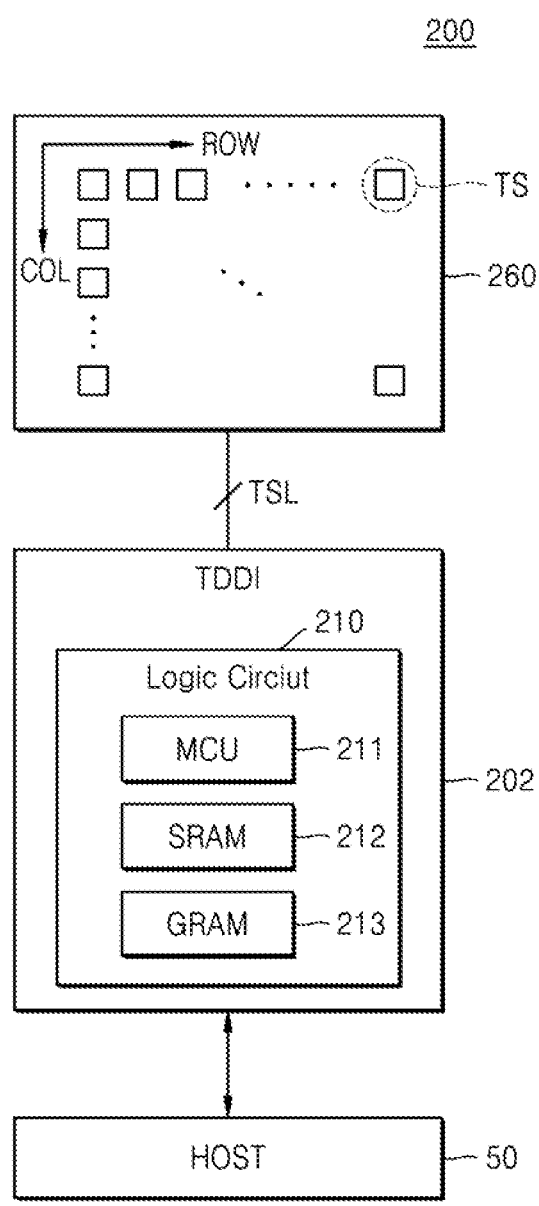

FIGS. 4A and 4B are diagrams of operations of an electronic device 200, according to example embodiments.

Referring to FIG. 4A, the electronic device 200 may include a logic circuit 210, a source driver 220, a gate driver 230, a voltage generator 240, and a display panel 250.

The TDDI may include the logic circuit 210, the source driver 220, the gate driver 230, and the voltage generator 240, and may be implemented as a single chip or a plurality of semiconductor chips.

The display panel 250 may include a plurality of gate lines GL1 through GLn, a plurality of data lines DL1 through DLm (or, referred to as a plurality of source lines) arranged in a direction crossing the plurality of gate lines GL1 through GLn, and pixels PX arranged at locations where the plurality of gate lines GL1 through GLn and the plurality of data lines DL1 through DLm cross each other.

The logic circuit 210 may include an MCU 211, SRAM 212, and GRAM 213. The MCU 211 may execute display FW, which is a basis of display-related operations to be described below, by using the SRAM 212. The MCU 211 may store image data DDATA received from the outside to the GRAM 213. The MCU 211 may output at a proper timing the image data DDATA stored in the GRAM 213 in response to control signals received from the outside. The MCU 211 may output the image data DDATA stored in the GRAM 213 in a unit of one line, or may convert a protocol of the MCU 211 to meet an interface specification of the source driver 220, and then, output the image data DDATA to the source driver 220. In this case, the MCU 211 may be referred to as a timing controller.

The source driver 220 may drive the plurality of data lines DL1 through DLm of the display panel 250 based on the image data DDATA and a first control signal CONT1. The source driver 220 may convert the image data DDATA into an analog signal, and output the analog signals s to the plurality of data lines DL1 through DLm. The analog signal may include a gradation voltage corresponding to the image data DDATA.

The gate driver 230 may sequentially scan the plurality of gate lines GL1 through GLn based on a second control signal CONT2. The gate driver 230 may activate a selected gate line by applying a gate on voltage VON to the selected gate line, and the source driver 220 may output the gradation voltage corresponding to the pixel PX connected to the activated selected gate line. Accordingly, in the display panel 250, an image may be displayed in a unit of one horizontal line, that is, in a unit of one line.

The voltage generator 240 may generate voltages used by the electronic device 200, e.g., an analog power voltage AVDD, the gate on voltage VON, and a gate off voltage VOFF, by receiving a power voltage VDD from the outside. The voltage generator 240 may generate various additional voltages according to a type of the electronic device 200.

Referring to FIG. 4B, the electronic device 200 may include a touch panel 260, a TDDI 202, and a host 50.

The TDDI 202 may include the logic circuit 210, and the logic circuit 210 may include the MCU 211, the SRAM 212, and the GRAM 213.

As described above, the touch panel 260 may be integrated with the display panel 250 in FIG. 4A. The touch panel 260 may include a plurality of touch sensors TS. As an example, the plurality of touch sensors TS may be arranged in a row direction ROW and a column direction COL.

The touch panel 260 may be driven by the TDDI 202. The TDDI 202 may be connected to the touch panel 260 via touch sensing lines TSL.

In an example embodiment, the MCU 211 may store the touch FW data, received from the host 50, to the SRAM 212, and then execute the touch FW by using the SRAM 212. In another example embodiment, the MCU 211 may store the touch FW data, received from the host 50, to the GRAM 213, and then copy the touch FW data stored in the GRAM 213 to a non-volatile memory. Thereafter, the MCU 211 may execute the touch FW by reading the touch FW data stored in a non-volatile memory.

The MCU 211 may generate signals for sensing the touch input based on the touch FW. The MCU 211 may be connected to the touch sensors TS via the touch sensing lines TSL. The MCU 211 may obtain touch sensing data corresponding to a capacitance change occurring in the touch sensors TS via the touch sensing lines TSL. The MCU 211 may transmit the touch sensing data to the host 50. In this case, the MCU 211 may control the overall operation of the touch sensing, and may be referred to as a touch controller.

Figure 5:
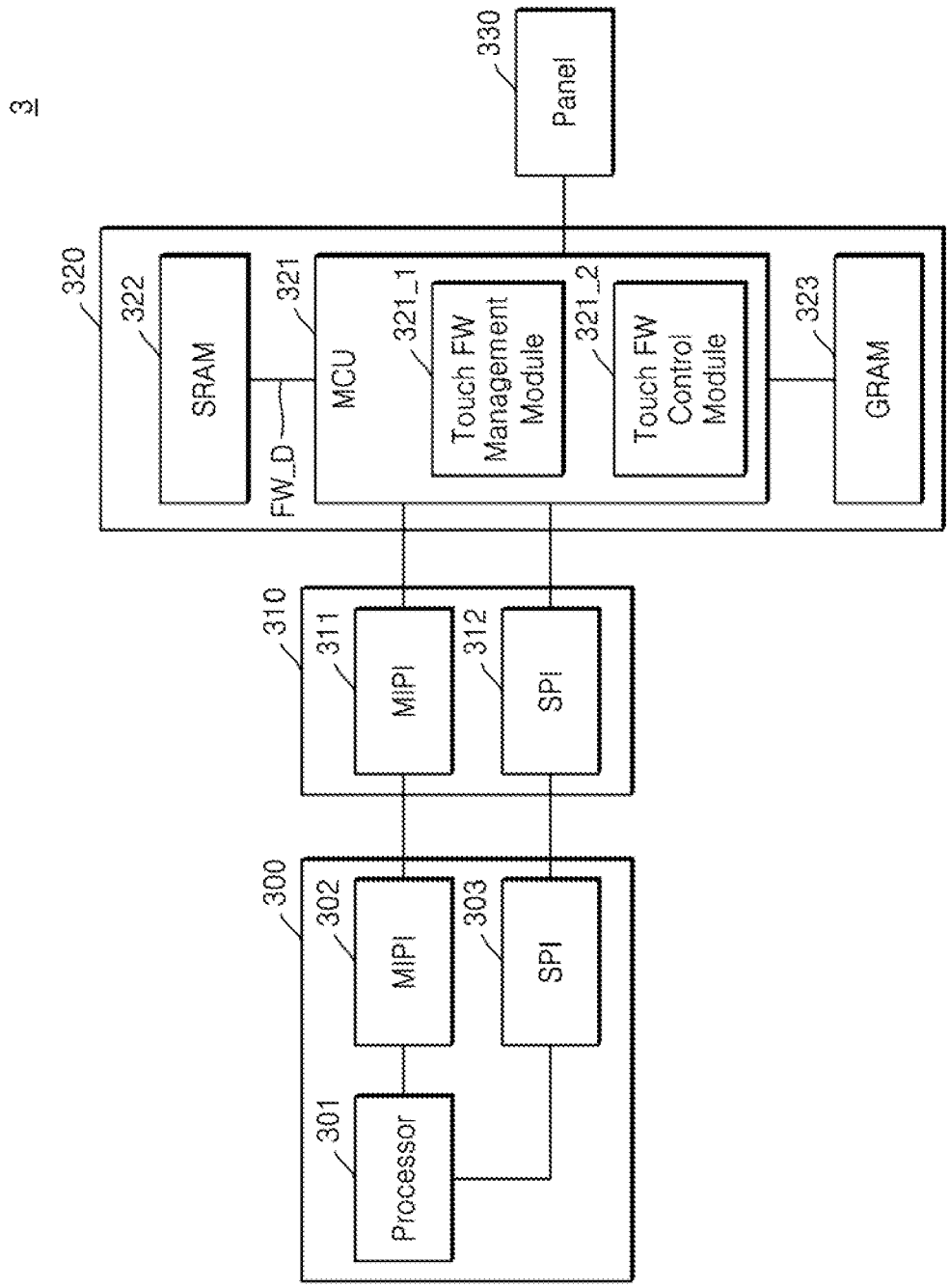
FIG. 5 is a block diagram of an electronic device according to an example embodiment.
Figure 6A:
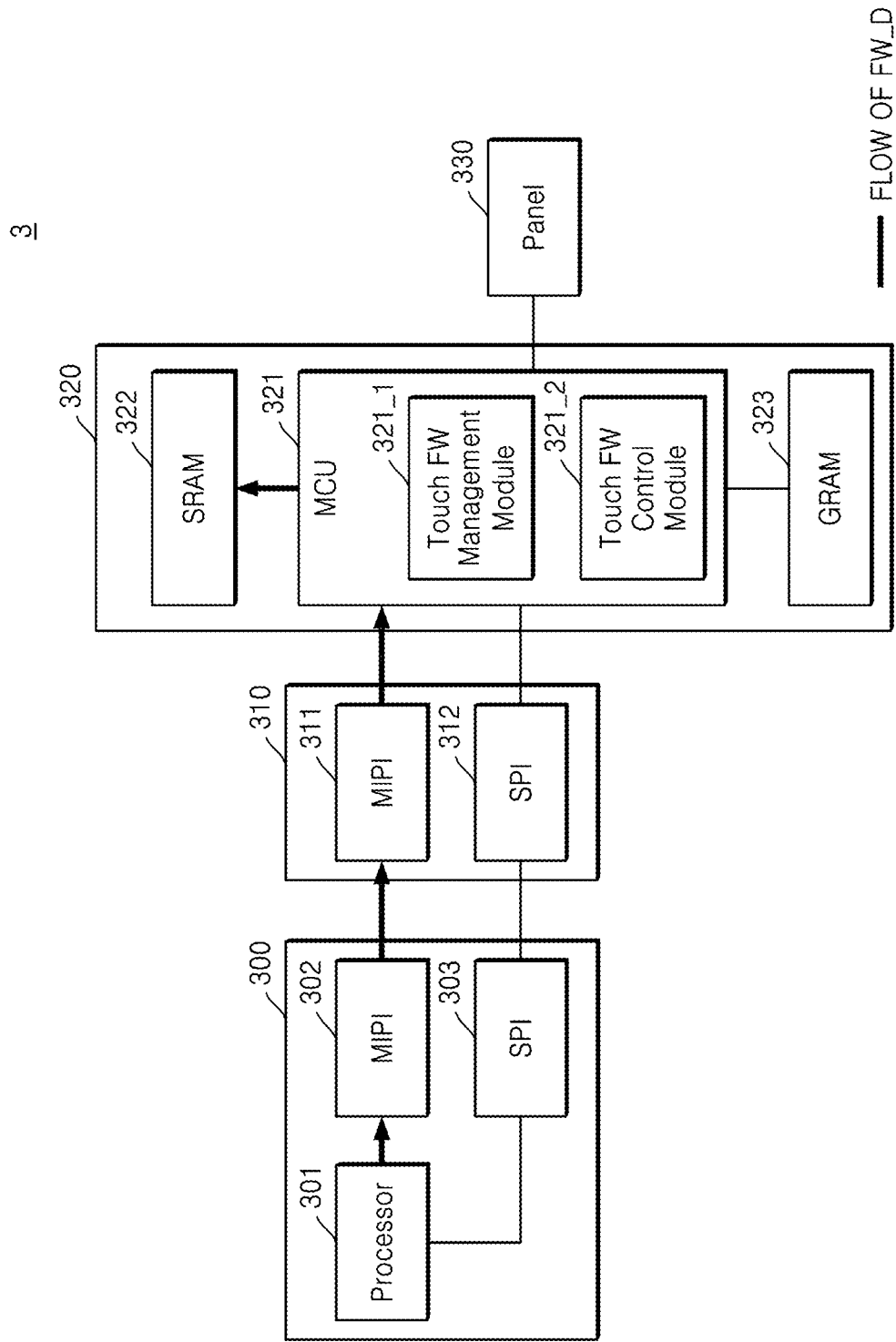
FIGS. 6A through 6C are block diagrams of data flow of an electronic device, according to example embodiments.
Figure 6B:
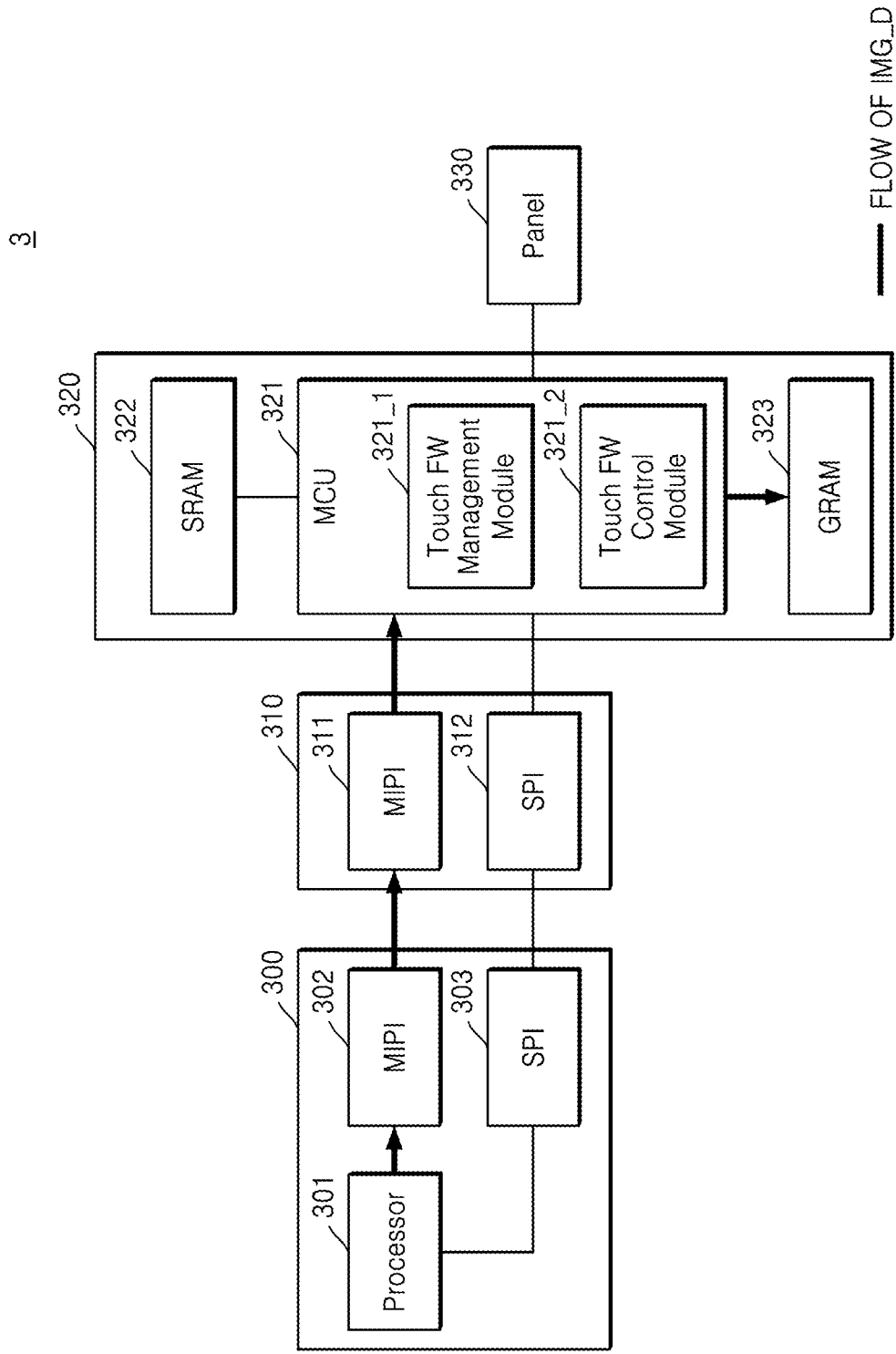
Figure 6C:
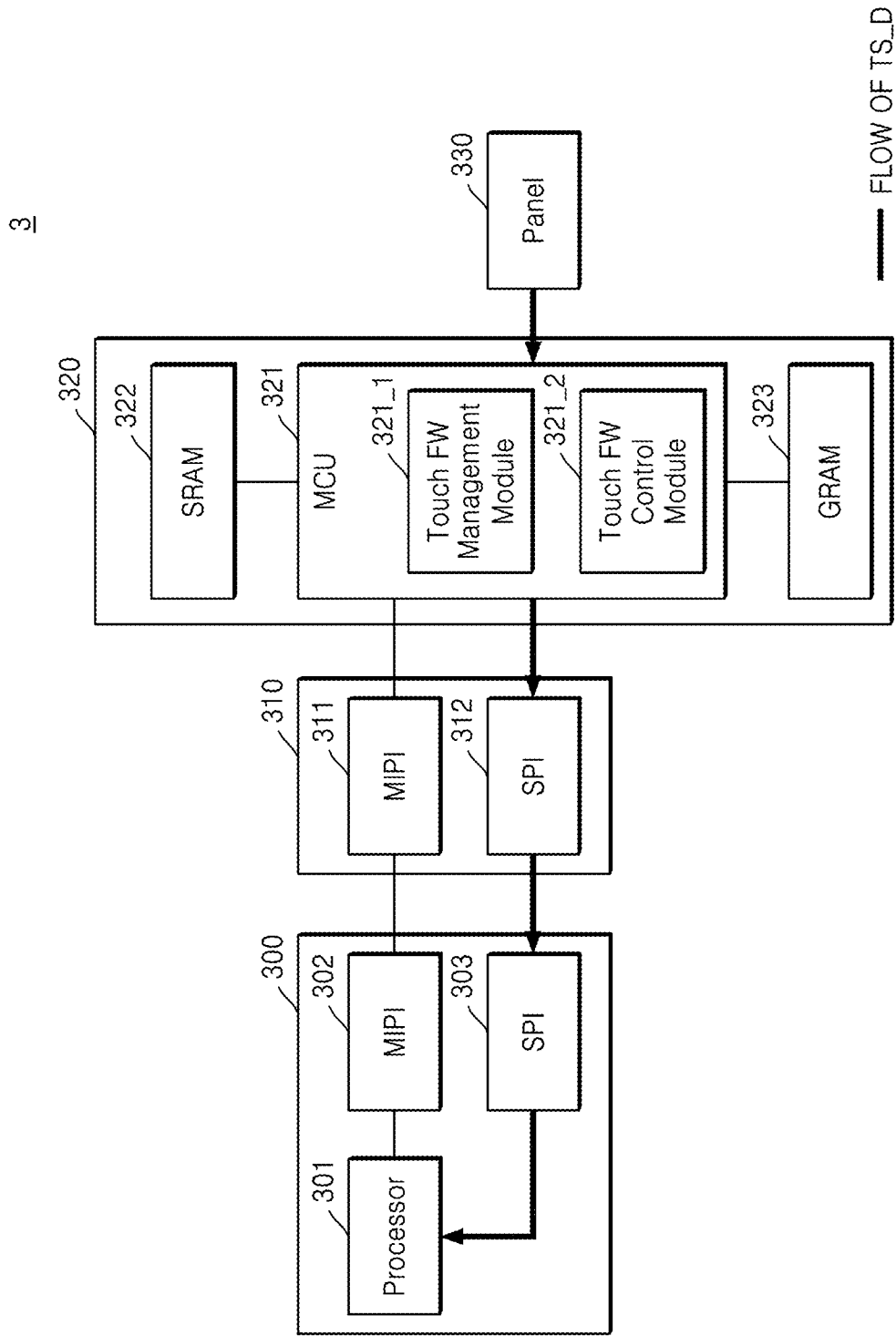

FIG. 5 is a block diagram of an electronic device 3 according to an example embodiment, and FIGS. 6A through 6C are block diagrams of data flow of the electronic device 3.

Referring to FIG. 5, the electronic device 3 may include an interface circuit 310, a TDDI 320, and a panel 330. A host 300 may include a processor 301, an MIPI 302, and an SPI 303.

The MIPI 302 and the SPI 303 may be referred to as a master MIPI, and a master SPI, respectively. The MIPI 302 may include more pins than the SPI 303, and may support a faster data transfer rate. The processor 301 may transmit a signal or data for controlling an overall operation of the electronic device 3 to a TDDI 320 via an interface circuit 310. Hereinafter, descriptions are given mainly on that a host 300 and the TDDI 320 transceive each other data related with displaying and touch sensing.

In an example embodiment, the interface circuit 310 may include an MIPI 311 and an SPI 312. The MIPI 311 and the SPI 312 may be referred to as a slave MIPI and a slave SPI, respectively. The MIPI 311 may include more pins than the SPI 312, and may support a faster data transfer rate. However, the MIPI 311 and the SPI 312 of the interface circuit 310 are merely examples, and it will be understood that example embodiments may be applied to heterogeneous interfaces supporting different transmission rates. Also, in FIG. 5, the interface circuit 310 is illustrated as a discrete configuration from the TDDI 320, but the interface circuit 310 may be implemented to be included in the TDDI 320.

The TDDI 320 may include an MCU 321, SRAM 322, and GRAM 323.

The MCU 321 may include a touch FW management module 321_1 and a touch FW control module 321_2.

In an example embodiment, the touch FW management module 321_1 may control a series of operations of storing, in the SRAM 322, the touch FW data received from the processor 301 via the MIPIs 302 and 311. In addition, the touch FW management module 321_1 may manage touch FW update data received from the processor 301 via the MIPIs 302 and 311 for updating the touch FW. In an example embodiment, the touch FW management module 321_1 may store the touch FW update data in the GRAM 323, and may update the touch FW based on the touch FW update data by accessing the GRAM 323. In an example embodiment, the touch FW management module 321_1 may transmit the updated touch FW data to the processor 301 via the MIPIs 311 and 302 ahead of the power off of the electronic device 3. The processor 301 may store the updated touch FW data in the first non-volatile memory (not illustrated) included in the host 300. Thereafter, after the electronic device 3 is powered on, the processor 301 may transmit the updated touch FW data stored in the first non-volatile memory (not illustrated) to the TDDI 320 via the MIPIs 302 and 311. In another example embodiment, the touch FW management module 321_1 may store the updated touch FW data in a second non-volatile memory (not illustrated) included in the TDDI 320 prior to the power off of the electronic device 3.

In an example embodiment, the touch FW control module 321_2 may execute the touch FW based on the touch FW data stored in the SRAM 322.

In an example embodiment, the panel 330 may include a display panel for displaying and a touch panel for touch sensing.

Detailed descriptions of various elements have been described with reference to FIGS. 3A and 3B, and may be omitted below.

Referring to FIG. 6A, the touch FW management module 321_1 may receive touch FW data FW_D from the processor 301 via the MIPIs 302 and 311, and store the touch FW data FW_D in the SRAM 322.

The touch FW control module 321_2 may load the touch FW data FW_D stored in the SRAM 322 and execute the touch FW.

According to the example embodiment of FIG. 6A, the touch firmware data FW_D may not be stored in another memory, but stored in the SRAM 322, and the touch firmware control module 321_2 may quickly access the touch firmware data FW_D and execute the touch FW.

Referring to FIG. 6B, the TDDI 320 may receive image data IMG_D from the processor 301 via the MIPIs 302 and 311, and store the received image data IMG_D in the GRAM 323. In an example embodiment, the touch FW update data described with reference to FIG. 6A may be stored together with image data IMG_D in the GRAM 323.

As described above, the MIPIs 302 and 311 may provide transmission paths of the touch firmware data FW_D and the image data IMG_D in FIG. 6A.

In an example embodiment, the MIPIs 302 and 311 may also provide a transmission path of FW update data. In an example embodiment, the touch firmware data FW_D, the image data IMG_D, and the FW update data may have the same or identical data format according to the configuration of the MIPIs 302 and 311. The TDDI 320 may configure or set a mode register for differentiating and identifying each of the touch firmware data FW_D, the image data IMG_D, and the FW update data, which are received via the same interface. Details of an example embodiment will be described below with reference to FIGS. 7 and 8.

Referring further to FIG. 6C, the TDDI 320 may transmit touch sensing data TS_D generated by the panel 330 to the processor 301 via the SPIs 303 and 312. Thus, a data type transmitted via the SPIs 303 and 312 may be different from a data type transmitted via the MIPIs 302 and 311.

Figure 7:
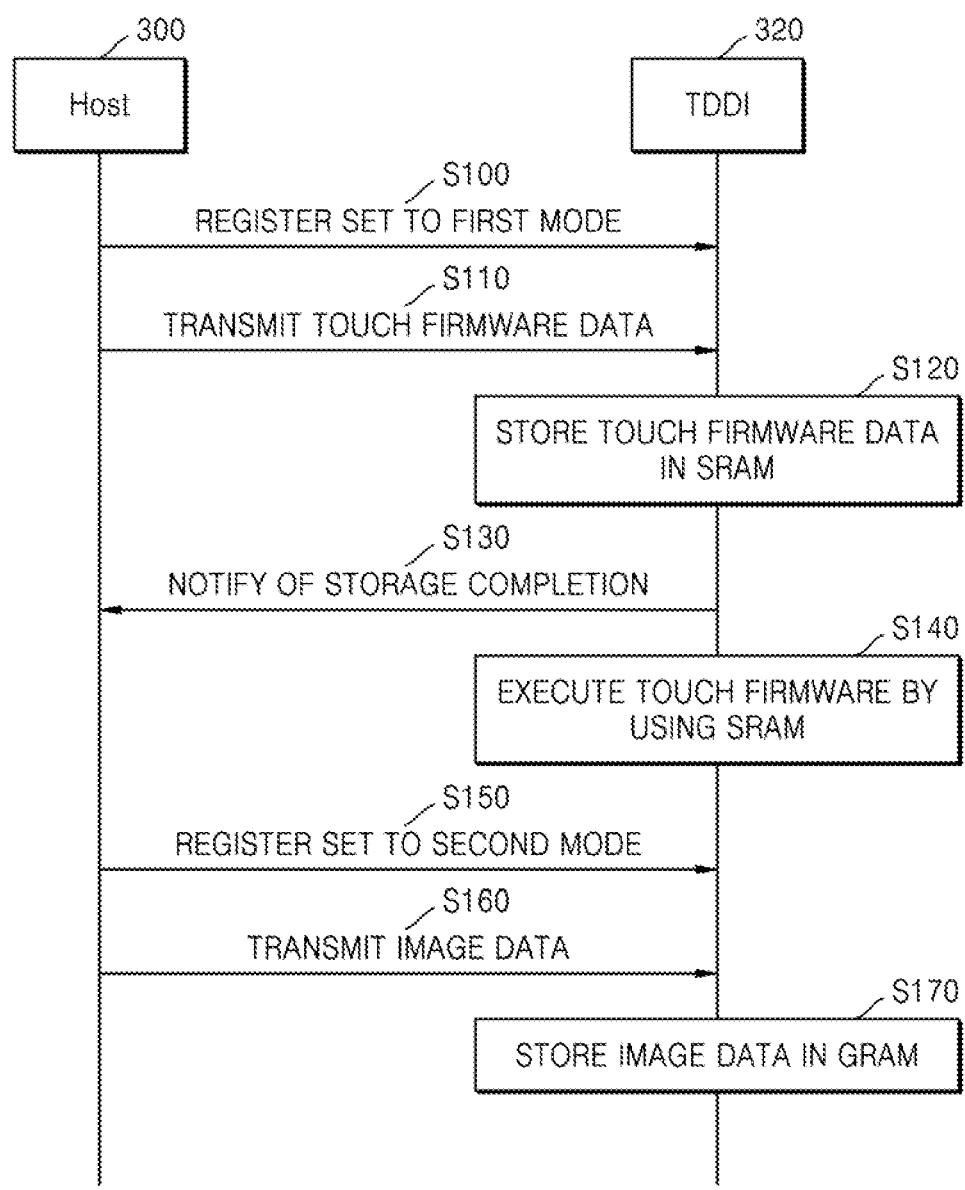
FIGS. 7 and 8 are flowcharts of operation methods of an electronic device, according to example embodiments.
Figure 8:
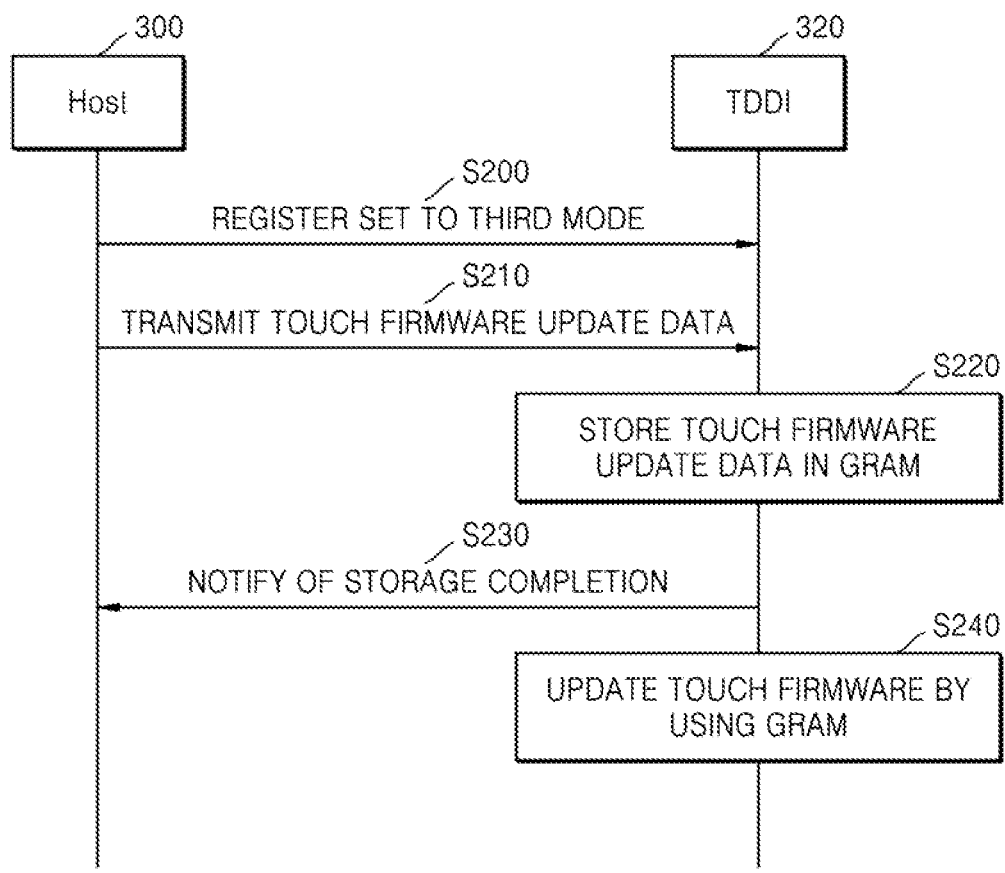

FIGS. 7 and 8 are flowcharts of operation methods of an electronic device, according to example embodiments. Hereinafter, the electronic device is assumed to include the host 300 and the TDDI 320.

Referring to FIG. 7, the host 300 may register set the TDDI 320 to a first mode prior to transmitting the touch FW data (S100). The host 300 may provide a set signal having a first value (e.g., a first register set signal) for register setting to the first mode, to the TDDI 320. The host 300 may transmit the touch FW data to the TDDI 320 (S110). The TDDI 320 may operate in the first mode and recognize that data presently received via the MIPI is the touch FW data, and may store the touch FW data in the SRAM in the TDDI 320 (S120). The TDDI 320 may inform the host 300 of completion of storing the touch FW data in the SRAM (S130). The TDDI 320 may execute the touch FW by using the SRAM (S140). The TDDI 320 may execute the touch FW by loading the touch FW data stored in the SRAM. The host 300 may register set the TDDI 320 to a second mode in response to notification of storage completion in operation S130 (S150). The host 300 may provide a set signal having a second value (e.g., a second register set signal) for register setting to the second mode, to the TDDI 320. The host 300 may transmit image data to the TDDI 320 (S160). The TDDI 320 may operate in the second mode and recognize that data presently received via the MIPI 311 is the touch FW data, and may store the image data in the GRAM in the TDDI 320 (S170).

Referring further to FIG. 8, the host 300 may register set the TDDI 320 to a third mode prior to transmitting the touch FW update data (S200). The host 300 may provide a set signal having a third value for register setting to the third mode, to the TDDI 320. The host 300 may transmit the touch FW update data to the TDDI 320 (S210). The TDDI 320 may operate in the third mode and recognize that data presently received via the MIPI 311 is the touch FW update data, and may store the touch FW update data in the GRAM 323 in the TDDI 320 (S220). The TDDI 320 may inform the host 300 of completion of storing the touch FW update data in the GRAM (S230). The TDDI 320 may update the touch FW by using the GRAM (S240). The TDDI 320 may access the GRAM to read the touch firmware update data, and may update the touch FW based on the touch firmware update data.

Figure 9:
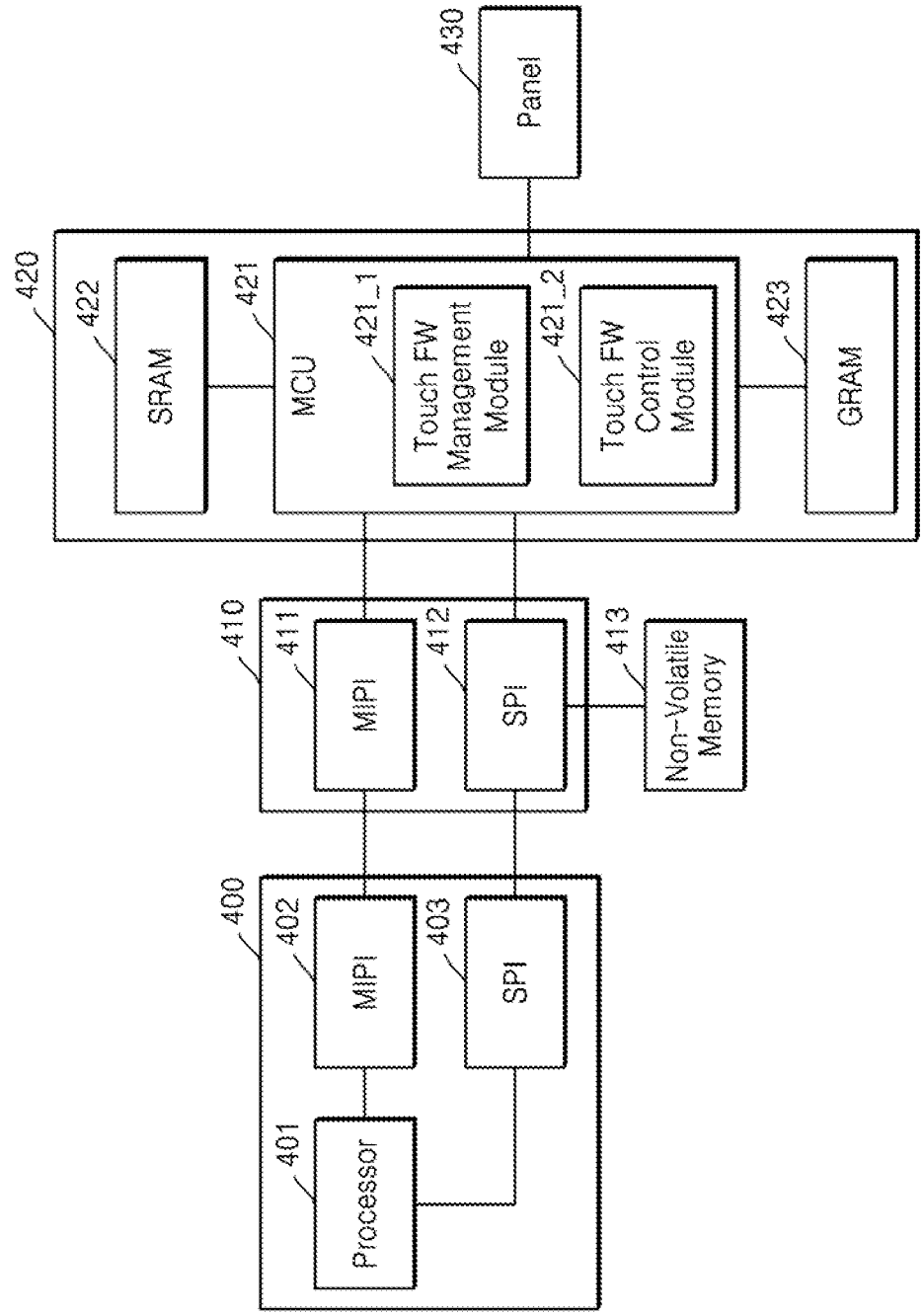
FIG. 9 is a block diagram of an electronic device according to an example embodiment.
Figure 10A:
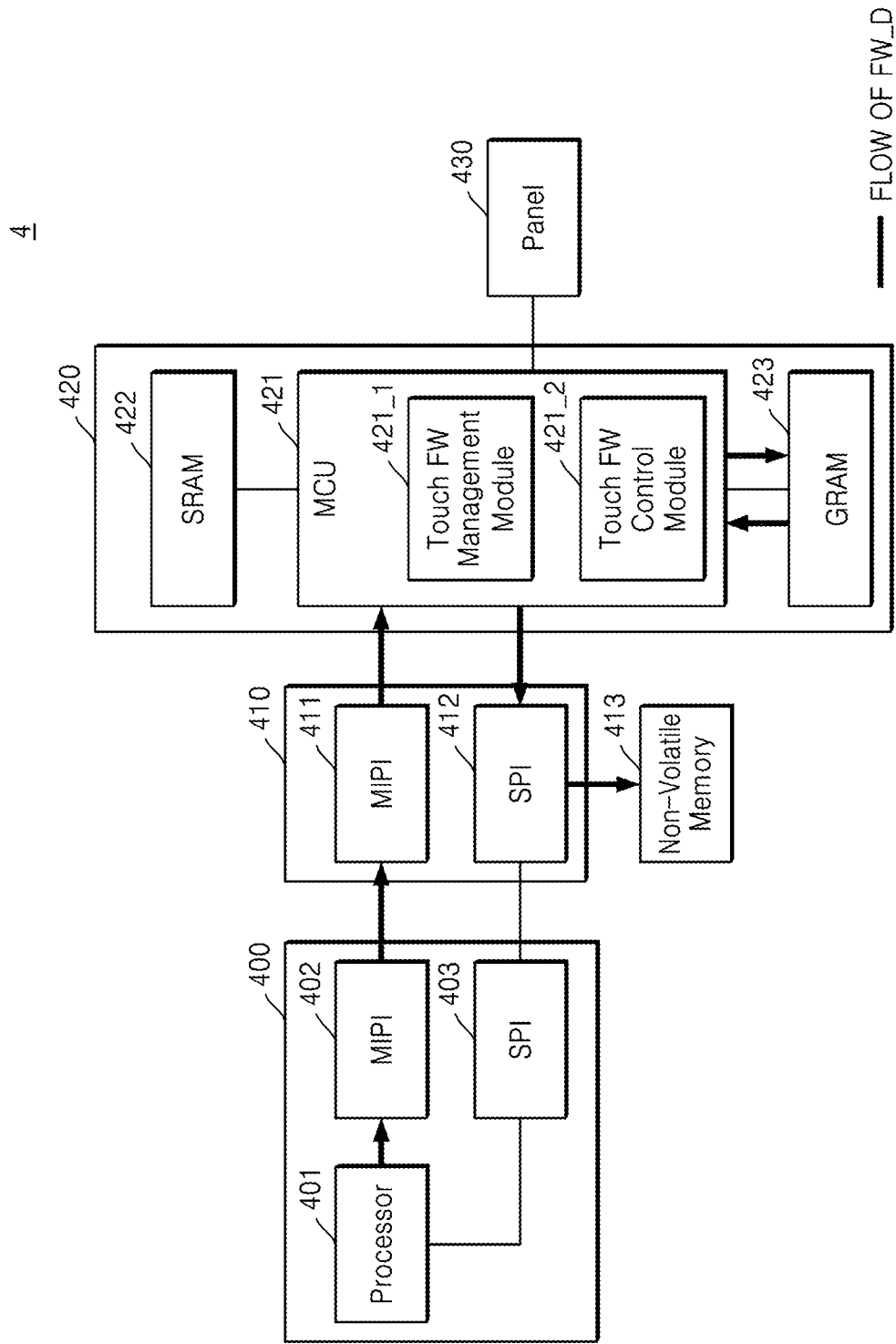
FIGS. 10A and 10B are block diagrams of data flow of an electronic device, according to example embodiments.
Figure 10B:
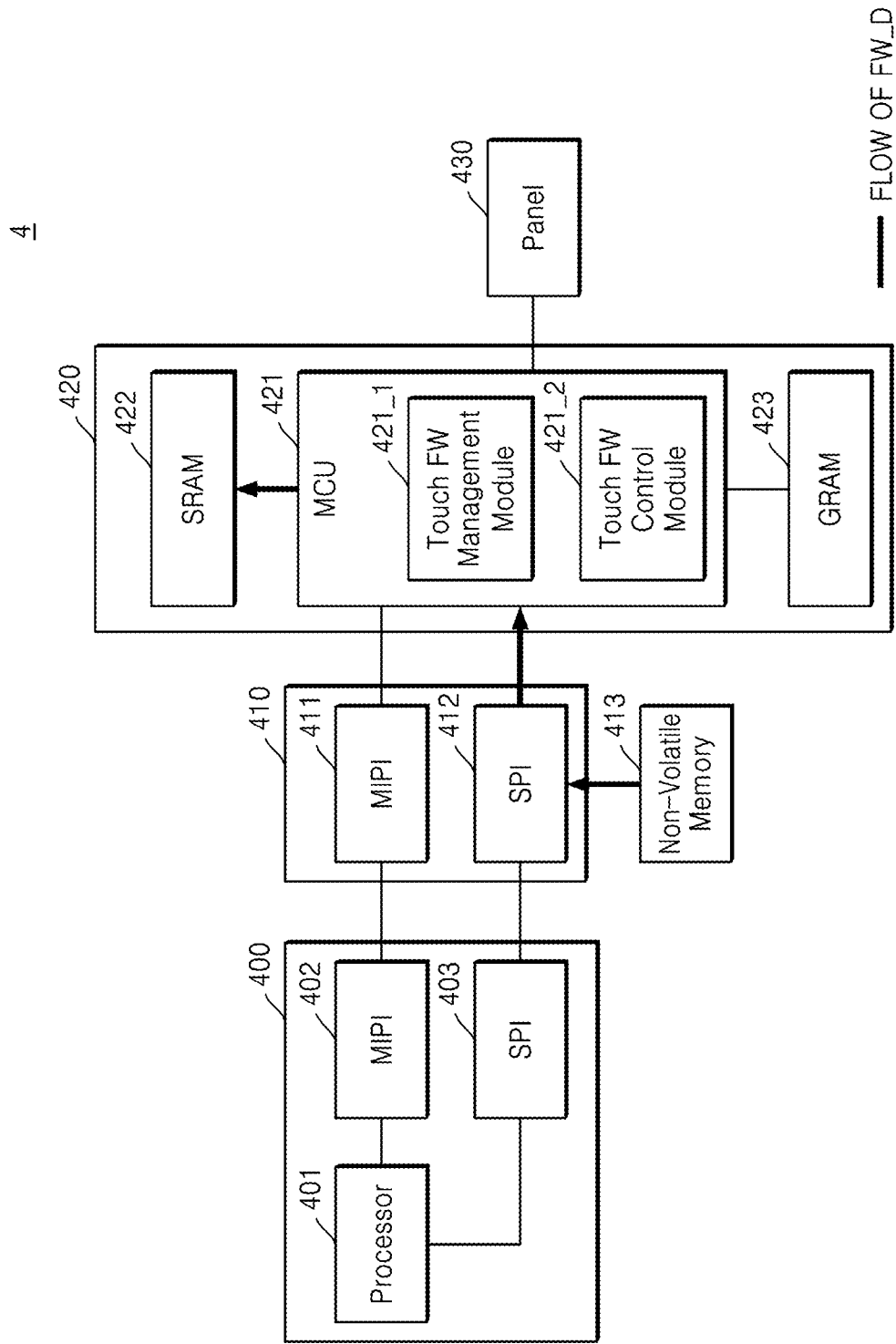

FIG. 9 is a block diagram of an electronic device 4 according to an example embodiment, and FIGS. 10A through 10B are block diagrams of data flow of the electronic device 4, according to example embodiments.

Referring to FIG. 9, the electronic device 4 may include a host 400, an interface circuit 410, a TDDI 420, and a panel 430.

The host 400 may include a processor 401, an MIPI 402, and an SPI 403.

The TDDI 420 may include an MCU 421, SRAM 422, and GRAM 423.

Hereinafter, descriptions on the electronic device 4 and the electronic device 3 of FIG. 5 are given mainly on different configurations from each other, and duplicate descriptions of the electronic device 3 of FIG. 5 may be omitted.

In an example embodiment, the interface circuit 410 may include an MIPI 411 and an SPI 412.

A non-volatile memory 413 may be arranged outside the TDDI 420, and connected to the TDDI 420 via the interface circuit 410. In another example embodiment, the non-volatile memory 413 may be implemented to be included in the TDDI 420.

In addition, in FIG. 9, the interface circuit 410 is illustrated as a separate configuration from the TDDI 420, but the interface circuit 410 may be implemented, e.g., to be included in the TDDI 420.

In an example embodiment, a touch FW management module 421_1 may store the touch FW data received from the processor 401 via the MIPIs 402 and 411 in the GRAM 423, and then, may control a series of operations of storing the stored touch FW data in the non-volatile memory 413.

In an example embodiment, a touch FW control module 421_2 may copy the touch FW data stored in the non-volatile memory 413 to the SRAM 422, and then, may execute the touch FW based on the touch FW data of the SRAM 422.

Referring to FIG. 10A, the touch FW management module 421_1 may receive the touch FW data FW_D from the processor 401 via the MIPIs 402 and 411, and store the received touch FW data FW_D in the GRAM 423. Thereafter, the touch FW management module 421_1 may store the touch FW data FW_D stored in the GRAM 423 to the non-volatile memory 413.

In an example embodiment, the SPI 412 may further include an interface connecting the TDDI 420 to the non-volatile memory 413, and the touch FW management module 421_1 may store the touch FW data FW_D in the non-volatile memory 413 by using the interface of the SPI 412.

Referring to FIG. 10B, the touch FW management module 421_1 may access the non-volatile memory 413, and copy the touch FW data FW_D stored in the non-volatile memory 413 to the SRAM 422. In an example embodiment, the touch FW management module 421_1 may transmit the touch FW data FW_D from the non-volatile memory 413 to the SRAM 422 by using the interface of the SPI 412.

The touch firmware control module 421_2 may load the touch FW data FW_D stored in the SRAM 422, and execute the touch FW.

Figure 11:
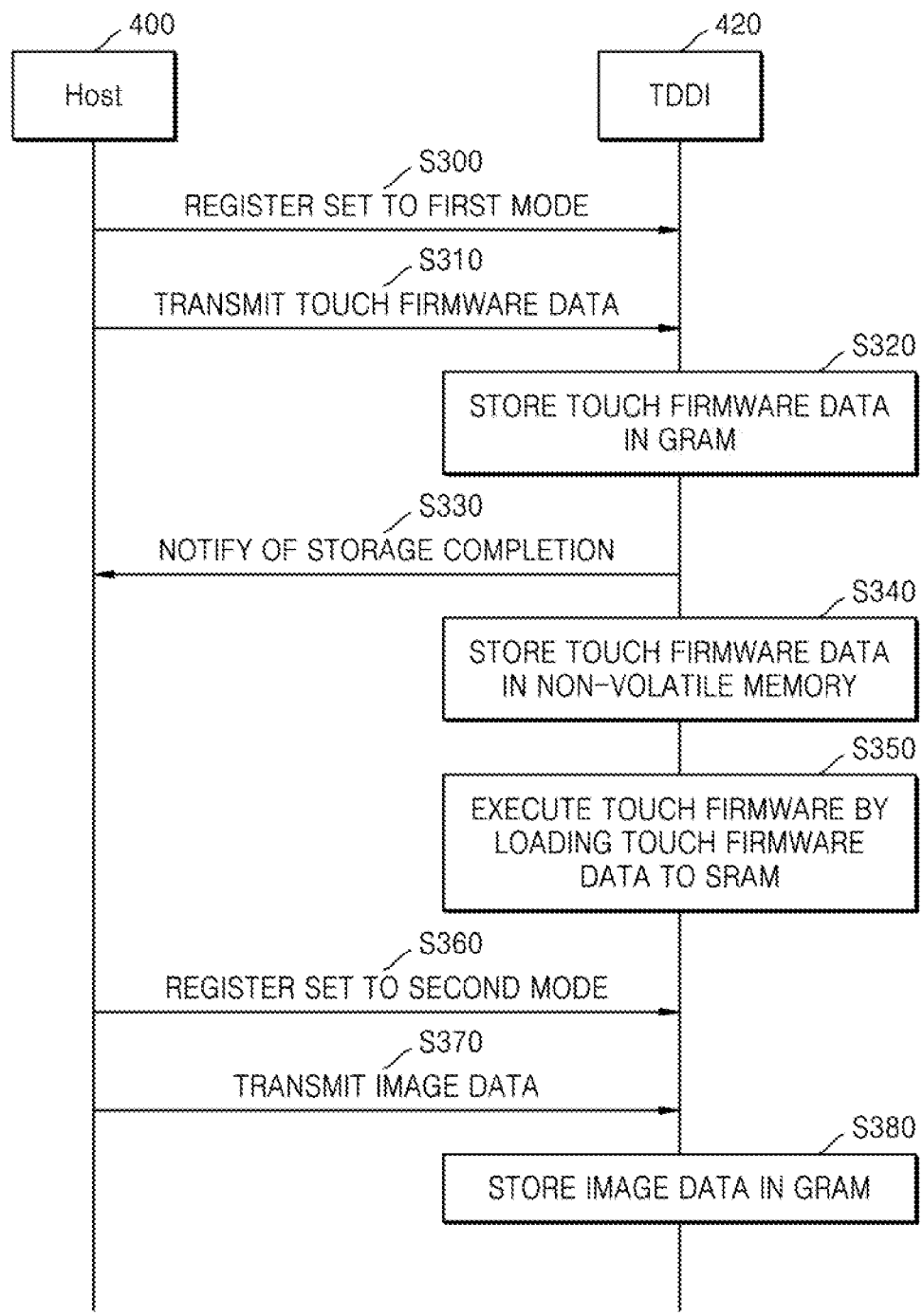
FIGS. 11 and 12 are flowcharts of operation methods of an electronic device, according to example embodiments.
Figure 12:
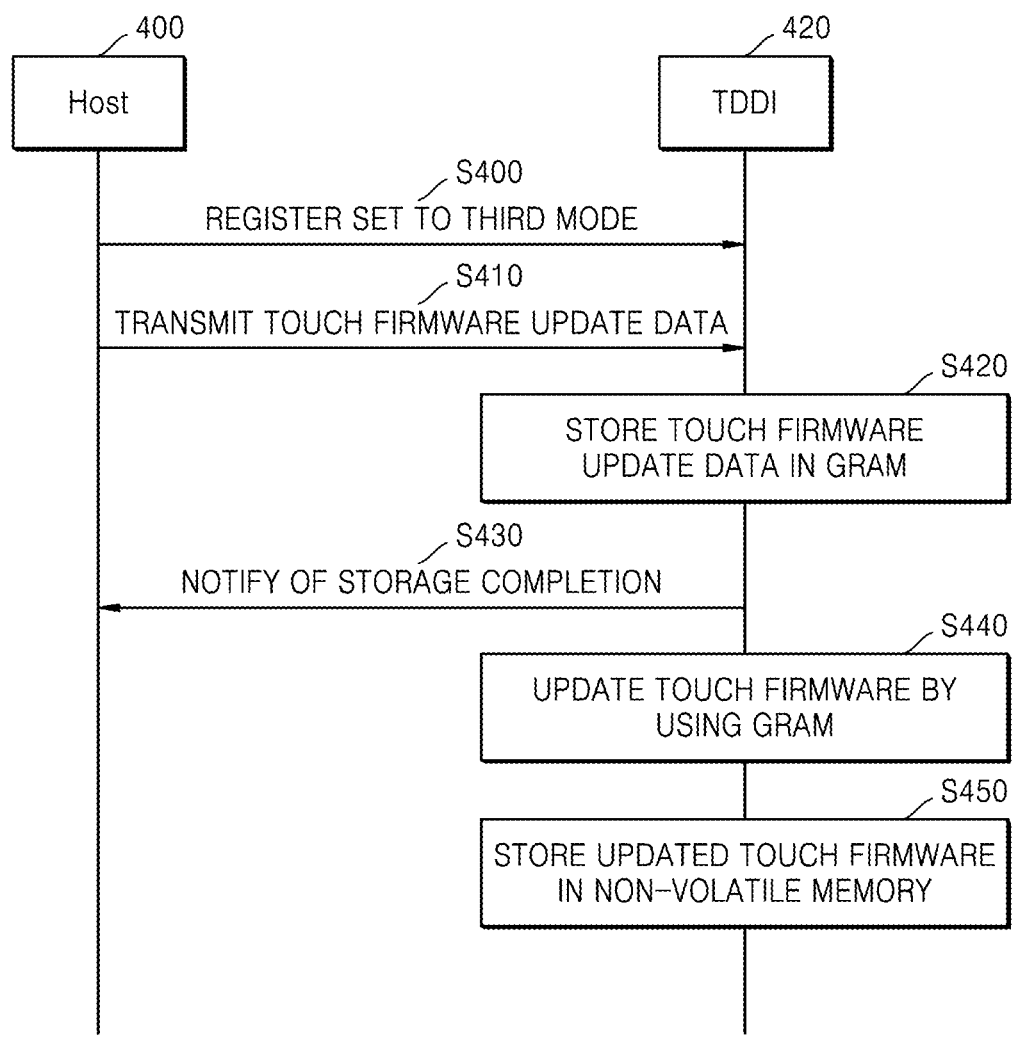

FIGS. 11 and 12 are flowcharts of operation methods of an electronic device, according to example embodiments. Hereinafter, the electronic device is assumed to include the host 400 and the TDDI 420.

Referring to FIG. 11, the host 400 may register set the TDDI 420 to the first mode prior to transmitting the touch FW data (S300). The host 400 may provide a set signal having the first value for register setting to the first mode, to the TDDI 420. The host 400 may transmit the touch FW data to the TDDI 420 (S310). The TDDI 420 may operate in the first mode and recognize that data presently received via the MIPI is the touch FW data, and may store the touch FW data in the SRAM in the TDDI (S320). The TDDI 420 may inform the host 400 of completion of storing the touch FW data in the GRAM (S330). The TDDI 420 may store the touch FW data in a non-volatile memory via an interface circuit (not illustrated) by using the GRAM (S340). Thereafter, when the TDDI 420 is powered on, or an electronic device including the TDDI 420 is powered on, operation S350 may follow. The TDDI 420 may load the TDDI 420 stored in a non-volatile memory to the SRAM, and execute the touch FW (S350). The host 400 may register set the TDDI 420 to the second mode in response to notification of storage completion in operation S330 (S360). The host 400 may provide a set signal having the first value for register setting to the second mode, to the TDDI 420. The host 400 may transmit image data to the TDDI 420 (S370). The TDDI 420 may operate in the second mode and recognize that data presently received via the MIPI is the touch FW data, and may store the image data in the GRAM in the TDDI 420 (S380).

Referring to FIG. 12, the host 400 may register set the TDDI 420 to a third mode prior to transmitting the touch FW update data (S400). The host 400 may provide a set signal having a third value for register setting to a third mode, to the TDDI 420. The host 400 may transmit the touch firmware update data to the TDDI 420 (S410). The TDDI 420 may operate in the third mode and recognize that data presently received via the MIPI is the touch FW update data, and may store the touch FW update data in the GRAM in the TDDI 420 (S420). The TDDI 420 may inform the host 400 of completion of storing the touch FW update data in the GRAM (S430). The TDDI 420 may update the touch FW by using the GRAM (S440). The TDDI 420 may store the updated touch FW (or, updated touch FW data) in a non-volatile memory via an interface circuit (not illustrated) (S450).

Figure 13:
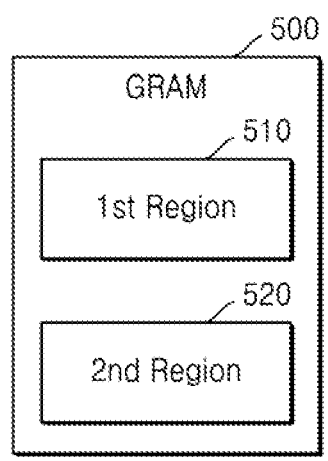
FIG. 13 is a diagram of an implementation example of graphics random access memory (GRAM), according to an example embodiment.

FIG. 13 is a diagram of an implementation example of GRAM 500, according to an example embodiment.

Referring to FIG. 13, the GRAM 500 may include a first memory region 510 and a second memory region 520. In an example embodiment, the touch FW data or touch FW update data may be stored in the first memory region 510, and image data may be stored in the second memory region 520.

In an example embodiment, an MCU may recognize a type of data received via an MIPI according to a mode register setting, and may store the recognized type of data in any one of the first and second memory regions 510 and 520.

Figure 14:
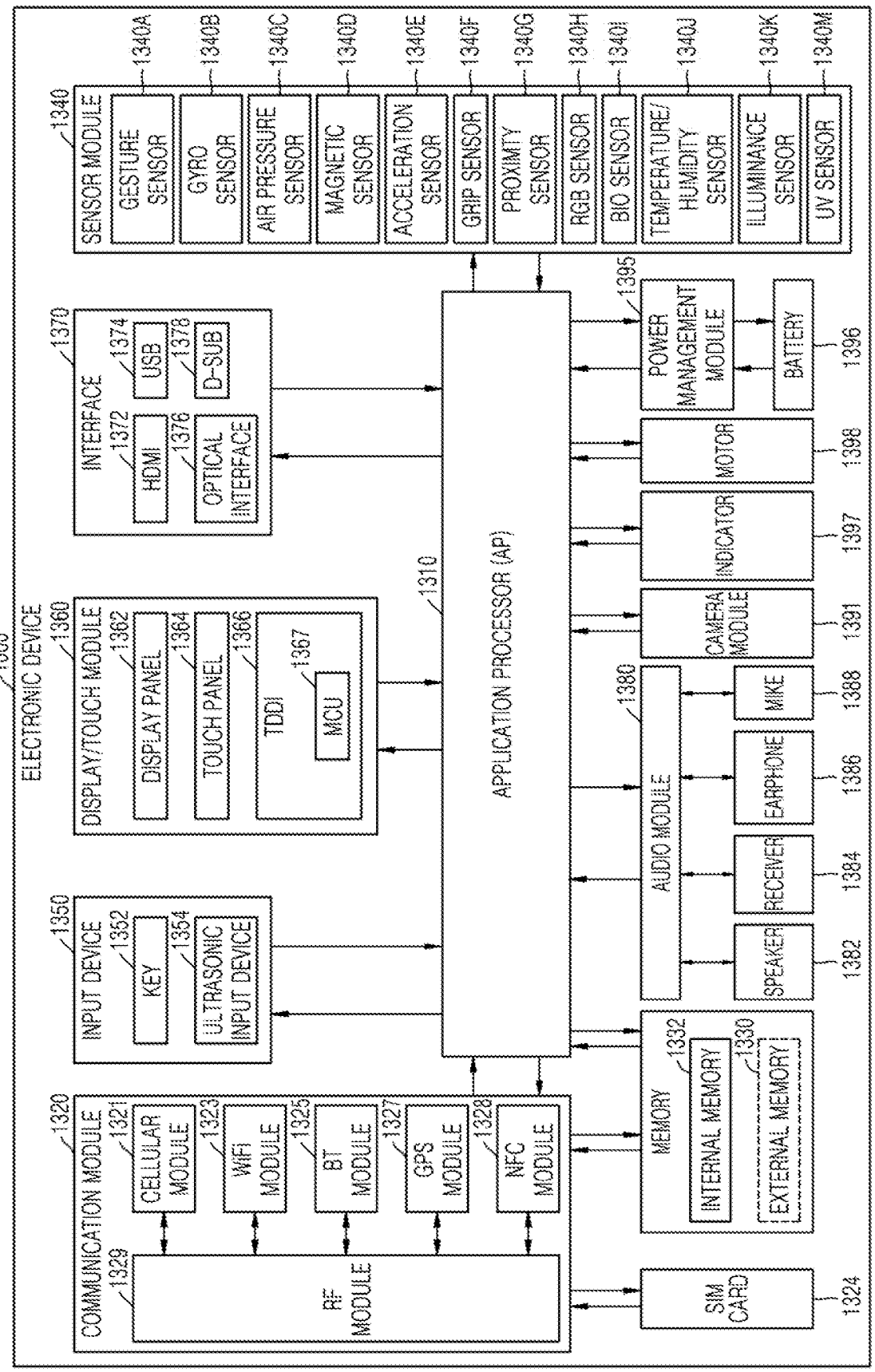
FIG. 14 is a block diagram of an electronic device according to an example embodiment.

FIG. 14 is a block diagram of an electronic device 1000, according to an example embodiment.

Referring to FIG. 14, the electronic device 1000 may include one or more of an application processor (AP) 1310, a communication module 1320, a subscriber identity module (SIM) card 1324, a memory 1330, a sensor module 1340, an input device 1350, a display/touch module 1360, an interface 1370, an audio module 1380, a camera module 1391, a power management module 1395, a battery 1396, an indicator 1397, and a motor 1398.

The AP 1310 may drive an operation system or an application program to control a plurality of hardware or software components connected to the AP 1310, and may perform processing and computation of various data including multimedia data. The AP 1310 may be implemented as, e.g., an SoC. The AP 1310 may include a graphics processing unit (GPU).

The communication module 1320 may perform operations for transceiving data in communication between the electronic device 1000 and other electronic devices connected to each other via a network. As an example, the communication module 1320 may include a cellular module 1321, a WiFi module 1323, a Bluetooth (BT) module 1325, a GPS module 1327, a near field communication (NFC) module 1328, and a radio frequency (RF) module 1329.

The cellular module 1321 may provide a voice call, a video call, a character service, or an Internet service, or the like via a communication network (for example, LTE, LTE-A, CDMA, WCDMA, UMTS, WiBro, GSM, etc.). In addition, the cellular module 1321 may perform, e.g., differentiation and authentication of an electronic device in a communication network by using a subscriber identification module (for example, the SIM card 1324. For example, the cellular module 1321 may perform at least some of the functions that the AP 1310 provides. For example, the cellular module 1321 may perform at least a portion of multimedia control functions.

The cellular module 1321 may include a communication processor (CP). In addition, the cellular module 1321 may be implemented as, e.g., an SoC.

As an example, the AP 1310 or the cellular module 1321 (for example, a CP) may load, to a volatile memory, a command or data received from at least one of a non-volatile memory and other components respectively connected thereto, and process the loaded command or data. In addition, the AP 1310 or the cellular module 1321 may store, in a non-volatile memory, data that is received from at least one of other components or generated by at least one of other components.

Each of the WiFi module 1323, the BT module 1325, the GPS module 1327, and the NFC module 1328 may include a processor for processing data transceived via a corresponding module.

The RF module 1329 may transceive data, e.g., an RF signal. The RF module 1329 may include, e.g., although not illustrated, a transceiver, a pulse amplitude module (PAM), a frequency filter, a low noise amplifier (LNA), etc. In addition, the RF module 1329 may further include a component for transceiving electromagnetic waves in a free space in wireless communication, e.g., a conductor, a conductive line, etc.

The SIM card 1324 may include a card including a SIM, and may be inserted into a slot formed at a particular location of an electronic device. The SIM card 1324 may include unique identification information (for example, integrated circuit card identifier (ICCID) or subscriber information (for example, international mobile subscriber identity (IMSI)).

The memory 1330 may include an internal memory 1332 or an external memory 1334.

The internal memory 1332 may include at least one of, e.g., a volatile memory (for example, DRAM, SRAM, synchronous DRAM (SDRAM), or the like), a non-volatile memory (for example, one time programmable read-only memory (ROM) (OTPROM), programmable ROM (PROM), erasable and programmable ROM (EPROM), electrically erasable and programmable ROM (EEPROM), mask ROM, flash ROM, a NAND flash memory, a NOR flash memory, or the like). As an example, the internal memory 1332 may include a solid state drive (SSD).

The external memory 1334 may include a flash drive, e.g., compact flash (CF), secure digital (SD), micro-SD, mini-SD, extreme digital (xD), a memory stick, or the like. The external memory 1334 may be functionally connected to the electronic device 1000 via various interfaces. As an example, the electronic device 1000 may further include a storage device (or a storage medium) such as a hard drive.

The sensor module 1340 may measure a physical quantity or to sense an operation status of the electronic device 1000, and convert measurement or sensed information into an electrical signal. The sensor module 1340 may include at least one of, e.g., a gesture sensor 1340A, a gyro sensor 1340B, an air pressure sensor 1340C, a magnetic sensor 1340D, an accelerator sensor 1340E, a grip sensor 1340F, a proximity sensor 1340G, a color sensor 1340H (for example, a red/green/blue (RGB) sensor), a bio sensor 1340I, a temperature/humidity sensor 1340J, an illuminance sensor 1340K, and an ultra violet (UV) sensor 1340M. Additionally or substantially, the sensor module 1340 may include, e.g., an e-nose sensor (not illustrated), an electromyography (EMG) sensor (not illustrated), an electroencephalogram (EEG) sensor (not illustrated), an electrocardiogram (ECM) sensor (not illustrated), an infra red (IR) sensor (not illustrated), an iris sensor (not illustrated), a fingerprint sensor (not illustrated), etc. The sensor module 1340 may further include a control circuit for controlling at least one or more sensors included therein.

The input device 1350 may include a key 1352 or an ultrasonic input device 1354. The key 1352 may include, e.g., a physical button, an optical key, or a keypad. The ultrasonic input device 1354 may include a device capable of sensing sound waves by using a mike (for example, a microphone 1388) in the electronic device 1000, via an input device generating an ultrasound signal, and may perform a wireless recognition. According to an example embodiment, the electronic device 1000 may receive a user input from an external device (for example, a computer or server) which is connected thereto by using the communication module 1320.

The display/touch module 1360 may include a display panel 1362, a touch panel 1364, and a TDDI 1366.

The display panel 1362 may include, e.g., a liquid crystal display (LCD), an active-matrix (AM) organic light emitting diode (OLED) (AM-OLED) display panel, etc. The display panel 1362 may be implemented as, e.g., flexible, transparent, or wearable.

The touch panel 1364 may recognize touch pressure by using at least one of an electrostatic method, a reduced pressure method, an infrared method, and an ultrasonic method. In addition, the touch panel 1364 may further include a control circuit. In the case of the electrostatic method, a physical contact or proximity recognition may be possible. The touch panel 1364 may further include a tactile layer. In this case, the touch panel 1364 may provide a user with a tactile response.

The display panel 1362 may also constitute one module together with the touch panel 1364.

The TDDI 1366 may drive the display panel 1362 to perform a display, and may drive the touch panel 1364 to perform touch sensing.

The TDDI 1366 may include an MCU 1367 to which the example embodiments are applied. As an example, the MCU 1367 may receive the touch firmware from the AP 1310 via an identical interface to an interface for transmitting the image data. In addition, the MCU 1367 may quickly complete touch FW execution preparation by storing the touch FW data in an internal volatile memory of the TDDI 1366.

On the other hand, the display panel 1362 may be replaced by a hologram device or a projector. The hologram device may show a stereoscopic image by using interference of light. The projector may display an image by projecting light on a screen. The screen may be arranged, e.g., inside or outside the electronic device 1000.

The interface 1370 may include, e.g., a high-definition multimedia interface (HDMI) 1372, a universal serial bus (USB) 1374, an optical interface 1376, or D-subminiature (D-sub) 1378. Additionally or substantially, the interface 1370 may include, e.g., a mobile high-definition link (MHL) interface, an SD card/MMC interface, or an infrared data association (IrDA) specification interface.

The audio module 1380 may bi-directionally convert sound to/from an electrical signal. The audio module 1380 may process sound information input or output via, e.g., a speaker 1382, a receiver 1384, an earphone 1386, or a microphone 1388.

The camera module 1391 may include a device capable of shooting stationary image and video image, and may include, e.g., one or more image sensors (for example, a front sensor or a rear sensor), a lens (not illustrated), an image signal processor (ISP) (not illustrated), or a flash (not illustrated) (for example, an LED or a xenon lamp).

The power management module 1395 may manage power of the electronic device 1000. Although not illustrated, the power management module 1395 may include, e.g., a PMIC, a charger IC, a battery, or a fuel gauge.

The PMIC may be mounted inside, e.g., an IC or SoC semiconductor. A charging method may be divided into wired charging and wireless charging. The charger IC may charge a battery, and prevent an over voltage or an inflow of excessive current from a charger. As an example, the charger IC may include a charger IC for at least one of a wired charging method and a wireless charging method. The wireless charging method may include, e.g., a magnetic resonance method, a magnetic induction method, an electromagnetic wave method, or the like, and a circuit such as an additional circuit for wireless charging, e.g., a coil loop, a resonance circuit, a rectifier, or the like may be added.

A battery gauge may measure, e.g., a remaining amount, a voltage during charging, a current, or temperature of the battery 1396. The battery 1396 may store or generate electricity, and provide power to the electronic device 1000 by using the stored or generated electricity. The battery 1396 may include, e.g., a rechargeable battery or a solar battery.

The indicator 1397 may indicate a particular status, e.g., a booting status, a message status, a charging status, or the like, of the electronic device 1000 or a portion thereof.

The motor 1398 may convert an electrical signal to a mechanical vibration.

Although not illustrated, the electronic device 1000 may include a processing device for supporting a mobile TV (for example, an GPU). The processing device for supporting mobile TV may process media data according to standards, e.g., digital multimedia broadcasting (DMB), digital video broadcasting (DVB), media flow, etc.

Figure 15:
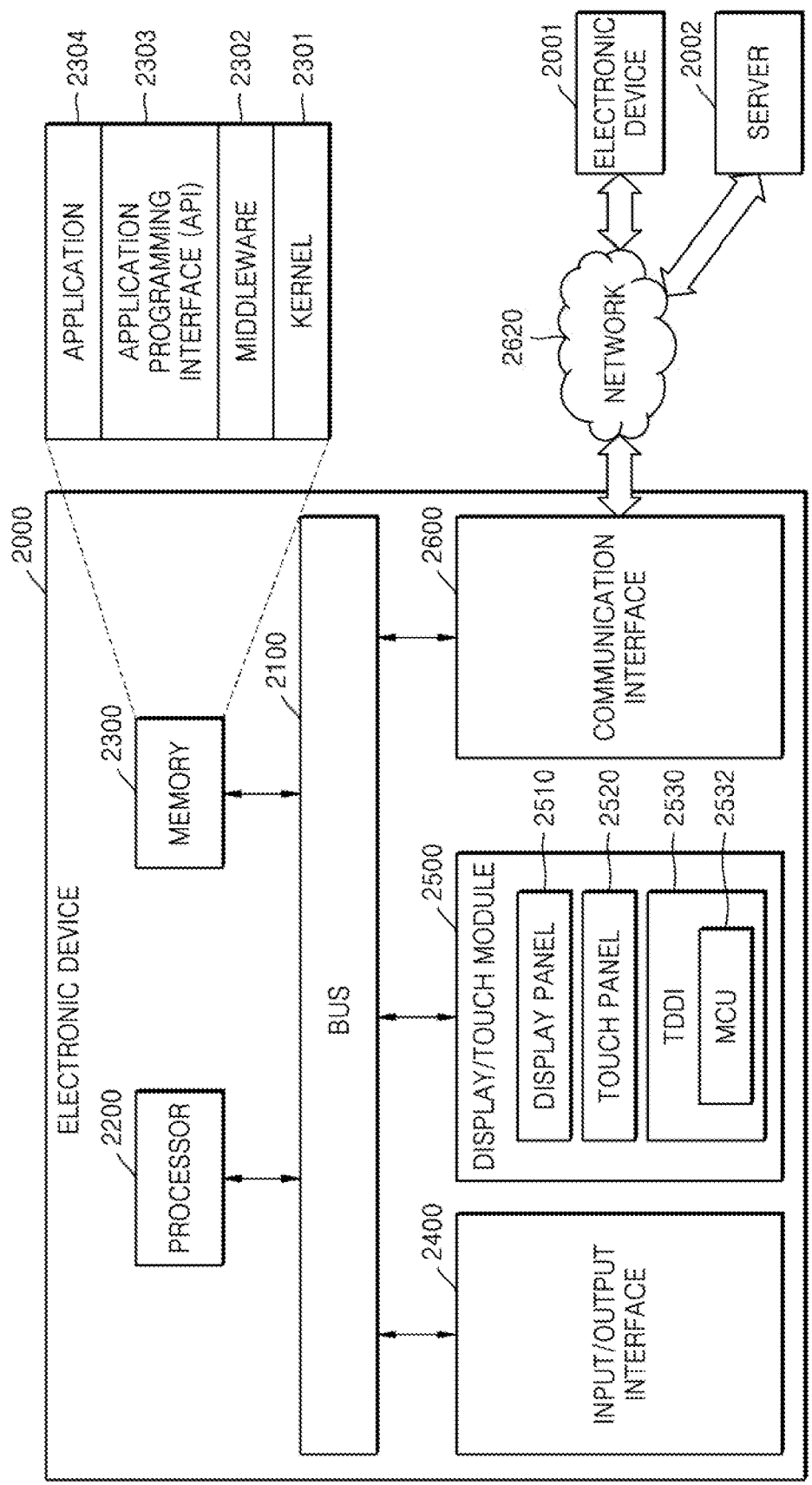
FIG. 15 is a block diagram of a network environment including an electronic device, according to an example embodiment.

FIG. 15 is a block diagram of a network environment including an electronic device 2000, according to an example embodiment.

Referring to FIG. 15, the electronic device 2000 may include a bus 2100, a processor 2200, a memory 2300, an input/output interface 2400, a display/touch module 2500, and a communication interface 2600.

The bus 2100 may include a circuit connecting above-described components to each other, and transmitting communication (for example, a control message) between the above-described components.

The processor 2200 may, e.g., receive commands from the above-described other components (for example, the memory 2300, the input/output interface 2400, the display/touch module 2500, or the communication interface 2600), decode the received commands, and execute computation or data processing according to the decoded commands.

The memory 2300 may store commands or data which are received from the processor 2200 or other components (for example, the input/output interface 2400, the display/touch module 2500, or the communication interface 2600, or the like), or generated by the processor 2200 or other components. The memory 2300 may include programming modules, e.g., a kernel 2301, a middleware 2302, an application programming interface (API) 2303, an application 2304, etc. Each of the programming modules described above may include software, firmware, hardware, or a combination of at least two of them.

The kernel 2301 may control or manage other remaining programming modules, e.g., system resources (for example, the bus 2100, the processor 2200, the memory 2300, or the like), which are used to execute operations or functions implemented in the middleware 2302, the API 2303, or the application 2304. In addition, the kernel 2301 may provide an interface, via which the middleware 2302, the API 2303, or the application 2304 approaches and controls or manages individual component of the electronic device 2000.

The middleware 2302 may perform a brokerage role so that the API 2303 or the application 2304 communicates with the kernel 2301 and exchange data. In addition, the middleware 2302 may, in relation with operation requests received from the application 2304, perform a control for an operation request (for example, scheduling or load balancing), by using a method of assigning a priority, or the like, so that, e.g., system resources of the electronic device 2000 (for example, the bus 2100, and the processor 2200, the memory 2300, or the like) are used to at least one application of the application 2304.

The API 2303 may include an interface with which the application 2304 controls functions provided by the kernel 2301 or the middleware 2302, and may include at least one interface or function (for example, a command) for, e.g., file control, window control, screen processing, character control, or the like.

The application 2304 may include a short message service/long message service (SMS/LMS) application, an e-mail application, a calendar application, an alarm application, a health care application (for example, an application for measuring an amount of exercise, blood sugar, or the like), an environment information application (for example, air pressure, humidity, temperature information, etc.). Additionally or substantially, the application 2304 may include an application related with information exchange between the electronic device 2000 and an external electronic device (for example, an electronic device 2001). An application related with information exchange may include a notification relay application for transmitting particular information to an external electronic device, or a device management application for managing the external electronic device.

For example, the notification relay application may include a function of relaying notification information occurring in other application of the electronic device 2000 (for example, the SMS/MMS application, the e-mail application, the health care application, the environment information application, or the like) to an external electronic device (for example, the electronic device 2001). Additionally or substantially, the notification relay application may, e.g., receive the notification information from an external electronic device (for example, the electronic device 2001), and provide the notification information to a user. The device management application may, e.g., manage (for example, install, remove, or update) functions (for example, turn-on/turn-off of the external electronic device itself (or, some components), or adjustment of brightness (or, resolution) of a display) of at least a portion of the external electronic device (for example, the electronic device 2001), applications operating in the external electronic device, or a service (for example, a call service or a message service) provided by the external electronic device.

The application 2304 may include an application designated according to characteristics (for example, a type of an electronic device) of the external electronic device (for example, the electronic device 2001). For example, when the external electronic device is an MP3 player, the application 2304 may include applications related with music playback. Similarly, when the external electronic device is a mobile medical equipment, the application 2304 may include applications related with the health care. As an example, the application 2304 may include at least one of an application designated to the electronic device 2000 or an application received from the external electronic device (for example, a server 2002) or the electronic device 2001).

The input/output interface 2400 may relay commands or data input from a user via an input/output device (for example, a sensor, a keyboard, or a touch screen) to, e.g., the processor 2200, the memory 2300, or a communication interface 2600 via a bus 2100. The input/output interface 2400 may, e.g., output commands or data received from the processor 2200, the memory 2300, or the communication interface 2600 via the bus 2100, to an input/output device (for example, a speaker or a display). For example, the input/output interface 2400 may output audio data processed by the processor 2200 to a user via a speaker.

The display/touch module 2500 may display various pieces of information (for example, multimedia data or text data) to a user, and may sense a touch input from the user. The display/touch module 2500 may include a display panel 2510, a touch panel 2520, and a TDDI 2530.

The TDDI 2530 may include an MCU 2532 to which example embodiments are applied. As an example, the MCU 2532 may receive the touch firmware from the AP 2200 via an identical interface to an interface for transmitting the image data. In addition, the MCU 2532 may quickly complete touch FW execution preparation by storing the touch FW data in an internal volatile memory of the TDDI 2530.

The communication interface 2600 may establish communication between the electronic device 2000 and an external device (for example, the electronic device 2001 or the server 2002). For example, the communication interface 2600 may be connected to a network 2620 via wireless communication or wired communication, and may communicate with an external device. Wireless communication may include at least one of, e.g., wireless fidelity (WiFi), Bluetooth (BT), near field communication (NFC), global positioning system (GPS), and cellular communication (for example, LTE, LTE-A, CDMA, WCDMA, UMTS, WiBro, GSM, etc.). Wired communication may include at least one of, e.g., universal serial bus (USB), high-definition multimedia interface (HDMI), recommended standard 232 (RS-232), and plain old telephone service (POTS).

As an example, the network 2620 may be a telecommunications network. The telecommunications network may include at least one of a computer network, Internet, Internet of Things, and a telephone network. As an example, protocol for communication between the electronic device 2000 and an external device (for example, transport layer protocol, data link layer protocol, or physical layer protocol) may be supported by at least one of the application 2304, an application programming interface 2303, the middleware 2302, the kernel 2301, and the communication interface 2600.

By way of summation and review, an electronic device may include a TDDI and may receive touch firmware data from a host for touch sensing. When receiving touch firmware data, the electronic devices may use a second interface that is different from a first interface used for receiving image data. In the case that the second interface supports a lower data transmission speed than the first interface, a significant amount of time may be required until the TDDI executes touch firmware by using the touch firmware data, and accordingly, the product competitiveness of the electronic device may be weakened.

As described above, embodiments may provide an electronic device configured to simplify an interface configuration for transceiving data, and to transmit firmware required for a certain operation at a rapid rate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electronic device, comprising:
a touch panel configured to sense a touch input;
a display panel configured to output an image;
a touch and display driver integration (TDDI) chip configured to control the touch panel and the display panel; and
an interface circuit for data interfacing with a host; and
a first volatile memory included in the TDDI chip,
wherein the TDDI chip is configured to receive touch firmware data from the host via the interface circuit, and manage the touch firmware data by using at least one of the interface circuit and a second volatile memory that is included in the TDDI chip.

2. The electronic device as claimed in claim 1, wherein:
the interface circuit includes a mobile industry processor interface, and
the TDDI chip is configured to receive the touch firmware data from the host via the mobile industry processor interface.

3. The electronic device as claimed in claim 2, wherein:
the interface circuit further includes a serial peripheral interface, and
the TDDI chip is configured to transmit touch sensing data generated by the touch panel to the host via the serial peripheral interface.

4. The electronic device as claimed in claim 1, wherein the TDDI chip is configured to be register set to a first mode by the host before receiving the touch firmware data, and store the touch firmware data in the second volatile memory based on the first mode.

5. The electronic device as claimed in claim 4, wherein the second volatile memory includes a static random access memory.

6. The electronic device as claimed in claim 1, wherein the TDDI chip is configured to receive image data from the host via the interface circuit, and store the image data in the first volatile memory included in the TDDI chip.

7. The electronic device as claimed in claim 6, wherein the first volatile memory includes a graphics random access memory.

8. The electronic device as claimed in claim 6, wherein:
the interface circuit includes a mobile industry processor interface, and
the TDDI chip is configured to receive the touch firmware data and the image data via the mobile industry processor interface.

9. The electronic device as claimed in claim 6, wherein the TDDI chip is configured to be register set to a second mode by the host before receiving the image data, and store the image data in the first volatile memory based on the second mode.

10. The electronic device as claimed in claim 1, wherein the TDDI chip is configured to store the touch firmware data in the first volatile memory, and execute touch firmware by using the second volatile memory.

11. The electronic device as claimed in claim 1, wherein the TDDI chip is configured to receive touch firmware update data via the interface circuit, and store the touch firmware update data in the first volatile memory included in the TDDI chip.

12. The electronic device as claimed in claim 11, wherein the TDDI chip is configured to update the touch firmware data based on the touch firmware update data read from the first volatile memory.

13. The electronic device as claimed in claim 1, further comprising a non-volatile memory,
wherein the TDDI chip is configured to receive the touch firmware data via the interface circuit, and store the touch firmware data in the non-volatile memory by using the first volatile memory included in the TDDI chip as a buffer.

14. The electronic device as claimed in claim 13, wherein the TDDI chip is configured to store the touch firmware data in the second volatile memory by reading the touch firmware data stored in the non-volatile memory, and execute touch firmware by using the first volatile memory.

15. An electronic device, comprising:
a touch/display module configured to sense a touch input, and output an image;
a touch and display driver integration (TDDI) chip configured to control the touch/display module;
an interface circuit including a first interface for receiving touch firmware data and image data from a host; and
a non-volatile memory for storing the touch firmware data,
wherein the TDDI chip is configured to receive the touch firmware data from the host via the first interface, and store the touch firmware data in the non-volatile memory by using a first volatile memory included in the TDDI chip.

16. The electronic device as claimed in claim 15, wherein the TDDI chip is configured to execute touch firmware by storing the touch firmware data from the non-volatile memory in a second volatile memory included in the TDDI chip.

* * * * *